(12) United States Patent
Kubota et al.

(10) Patent No.: US 10,656,495 B2
(45) Date of Patent: May 19, 2020

(54) OPTICAL SHEET, SCREEN, AND DISPLAY APPARATUS

(71) Applicant: DAI NIPPON PRINTING Co., Ltd., Tokyo (JP)

(72) Inventors: Shogo Kubota, Tokyo (JP); Makio Kurashige, Tokyo (JP); Kaori Nakatsugawa, Tokyo (JP)

(73) Assignee: DAI NIPPON PRINTING Co., Ltd., Tokyo (JP)

(*) Notice: Subject to any disclaimer, the term of this patent is extended or adjusted under 35 U.S.C. 154(b) by 102 days.

(21) Appl. No.: 15/764,906

(22) PCT Filed: Oct. 7, 2016

(86) PCT No.: PCT/JP2016/079899
§ 371 (c)(1),
(2) Date: Mar. 30, 2018

(87) PCT Pub. No.: WO2017/061584
PCT Pub. Date: Apr. 13, 2017

(65) Prior Publication Data
US 2018/0275480 A1 Sep. 27, 2018

(30) Foreign Application Priority Data
Oct. 8, 2015 (JP) .................. 2015-200054

(51) Int. Cl.
*G02F 1/19* (2019.01)
*G03B 21/62* (2014.01)
(Continued)

(52) U.S. Cl.
CPC .............. *G02F 1/19* (2013.01); *G02B 5/02* (2013.01); *G02B 27/48* (2013.01); *G03B 21/10* (2013.01);
(Continued)

(58) Field of Classification Search
CPC .......... G02B 27/48; G02B 26/00; G02B 3/00; G02B 3/06; G02B 5/003; G02B 5/02;
(Continued)

(56) References Cited

U.S. PATENT DOCUMENTS

2012/0224109 A1 9/2012 Okagaki et al.
2013/0170007 A1 7/2013 Kurashige et al.
(Continued)

FOREIGN PATENT DOCUMENTS

JP 2007-293166 A 11/2007
JP 2008-310260 A 12/2008
(Continued)

OTHER PUBLICATIONS

International Search Report dated Dec. 27, 2016 for the corresponding International Application No. PCT/JP2016/079899.
(Continued)

*Primary Examiner* — Jie Lei
(74) *Attorney, Agent, or Firm* — Michael Best & Friedrich LLP

(57) ABSTRACT

An optical sheet, a screen, and a display apparatus capable of reducing speckles are provided. An optical sheet (50) includes a particle layer (55) including a transparent retaining part (56) having a predetermined thickness and a particle (60) that is accommodated in a cavity (56a) formed in the retaining part (56) and includes a first portion (61) and a second portion (62) having different dielectric constants. The first portion (61) includes a transparent first main portion (66a) and a first diffusion component (66b) that diffuses light. The second portion (62) includes a transparent second main portion (67a) and a second diffusion component (67b) that diffuses light. The first diffusion component (66b) and the second diffusion component (67b) have a diameter d satisfying the following conditional expression (1):

(Continued)

$0.1\ \mu m \leq d \leq 15\ \mu m$ (1).

14 Claims, 20 Drawing Sheets

(51) Int. Cl.
*G02B 27/48* (2006.01)
*G02B 5/02* (2006.01)
*H04N 5/74* (2006.01)
*G03B 21/10* (2006.01)
*H04N 9/31* (2006.01)

(52) U.S. Cl.
CPC ............. *G03B 21/62* (2013.01); *H04N 5/74* (2013.01); *H04N 9/31* (2013.01)

(58) Field of Classification Search
CPC ...... G02B 21/62; G02B 21/625; G02B 21/60; G02B 21/567; G02F 1/19; G02F 1/29; H04N 9/31; H04N 5/74; G03B 21/62; G03B 21/625; G03B 21/60; G03B 21/567; G03B 21/10

USPC ............... 359/296, 295, 314, 316, 452, 599; 345/84, 85, 107; 348/744
See application file for complete search history.

(56) References Cited

U.S. PATENT DOCUMENTS

| | | | |
|---|---|---|---|
| 2013/0308183 A1 | 11/2013 | Vermeirsch et al. | |
| 2016/0266545 A1 | 9/2016 | Kurashige et al. | |

FOREIGN PATENT DOCUMENTS

| | | | |
|---|---|---|---|
| JP | 2013-539078 A | 10/2013 | |
| WO | 2011/070777 A1 | 6/2011 | |
| WO | 2012/033174 A | 3/2012 | |
| WO | 2016/171266 A1 | 10/2016 | |

OTHER PUBLICATIONS

Japanese Office Action dated Jun. 28, 2017 for the corresponding Japanese Patent Application No. 2017/530240
European Search Report dated Jun. 7, 2019 for the corresponding European patent application No. 16853735.5.

OPTICAL SHEET, SCREEN, AND DISPLAY APPARATUS

CROSS-REFERENCE TO RELATED APPLICATIONS

This application is entering into national phase of PCT Application No. PCT/JP2016/079899, filed on Oct. 7, 2016, which claims the priority from Japanese Patent Application No. 2015-200054, filed on Oct. 8, 2015 in the Japanese Patent Office. The entire contents of which are hereby incorporated by reference into this application.

TECHNICAL FIELD

The present invention relates to an optical sheet, an image-displaying screen using the optical sheet, and a display apparatus including the screen.

BACKGROUND ART

For example, as disclosed in Patent Literature 1 and Patent Literature 2, projectors using a coherent light source are widely used. For coherent light, laser light oscillated from a laser light source is typically used. If image light from a projector is formed by coherent light, speckles are observed on a screen that is irradiated with the image light. Speckles are perceived as a dot pattern and deteriorate display image quality. In Patent Literature 1, the incident angle of the image light incident on each position on the screen is temporally changed for the sake of reducing speckles. As a result, uncorrelated scattering patterns occur on the screen, and speckles can be reduced by the superposition of the scattering patterns.

CITATION LIST

Patent Literature

Patent Literature 1: International Publication No. 2012/033174
Patent Literature 2: JP 2008-310260 A

SUMMARY OF THE INVENTION

Problems to be Solved by the Invention

As another method for reducing speckles, it may be effective to temporally change the diffusion characteristic of the screen. Patent Literature 2 proposes a screen that is made of electronic paper. The screen according to Patent Literature 2 changes its reflectance according to an irradiation position of image light projected by a raster scan method.

If the reflectance of areas not irradiated with the image light is controlled to be low, the reflection of ambient light, such as external light and illumination light, from the areas of low reflectance can be suppressed to display a high-contrast image.

However, according to the screen disclosed in Patent Literature 2, the reflectance is only changed by a display ratio of white particles and black particles, with no effect on speckles occurring on a screen. To effectively reduce speckles occurring on a screen, it is effective to temporally change the diffusion wavefront while maintaining the diffusion characteristic of the screen. Methods such as directly vibrating a screen have heretofore been proposed. With many restrictions in terms of practical use, such methods have not yet become widely prevalent.

The present invention has been achieved in view of the foregoing, and it is an object thereof to provide an optical sheet, a screen, and a display apparatus which can sufficiently reduce speckles by a method different from the conventional ones.

Means for Solving the Problems

An optical sheet according to an embodiment of the present invention for achieving the foregoing object includes
 a particle layer including
 a transparent retaining part that has a predetermined thickness, and
 a particle that is accommodated in a cavity formed in the retaining part and includes a first portion and a second portion having different dielectric constants, wherein
 the first portion includes a transparent first main portion and a first diffusion component that diffuses light,
 the second portion includes a transparent second main portion and a second diffusion component that diffuses light, and
 the first diffusion component and the second diffusion component have a diameter d satisfying the following conditional expression (1):

$$0.1\ \mu m < d < 15\ \mu m \tag{1}$$

In the optical sheet according to an embodiment of the present invention,
 a volume fraction Vi indicating a proportion of a sum of volumes of the first diffusion component and the second diffusion component to a volume of the particle satisfies the following conditional expression (2):

$$Vi \geq 3\% \tag{2}$$

In the optical sheet according to an embodiment of the present invention,
 a refractive index difference Δn between the first and second diffusion components and the first and second main portions satisfies the following conditional expression (3):

$$|\Delta n| < 0.2 \tag{3}$$

A screen according to an embodiment of the present invention includes:
 the optical sheet; and
 an electrode that forms an electric field for driving the particle of the particle layer when a voltage is applied thereto.

In the screen according to an embodiment of the present invention,
 the electrode has a function of diffusing and reflecting light as a diffuse reflection layer.

A display apparatus according to an embodiment of the present invention includes:
 the screen; and
 a projector that irradiates the screen with coherent light.

The display apparatus according to an embodiment of the present invention further includes
 a power source that applies a voltage to the electrode of the screen; and
 a control device that controls a voltage applied from the power source to the electrode, wherein
 the control device controls the applied voltage from the power source so that the particle operates in the particle layer.

In the display apparatus according to an embodiment of the present invention, the control device controls the applied voltage from the power source to repeatedly rotate the particle within an angular range of less than 180°.

In the display apparatus according to an embodiment of the present invention, the control device controls at least either one of a direction and a position of the particle by the applied voltage from the power source so that the first portion covers at least part of the second portion from an observer side along a normal direction of the screen.

Advantages of the Invention

With the optical sheet, the image-displaying screen using the optical sheet, and the display apparatus including the screen according to an embodiment of the present invention, speckles can be reduced.

BEST MODE FOR CARRYING OUT THE INVENTION

A screen and a display apparatus according to the present invention will be described below with reference to the drawings.

Figure 1:
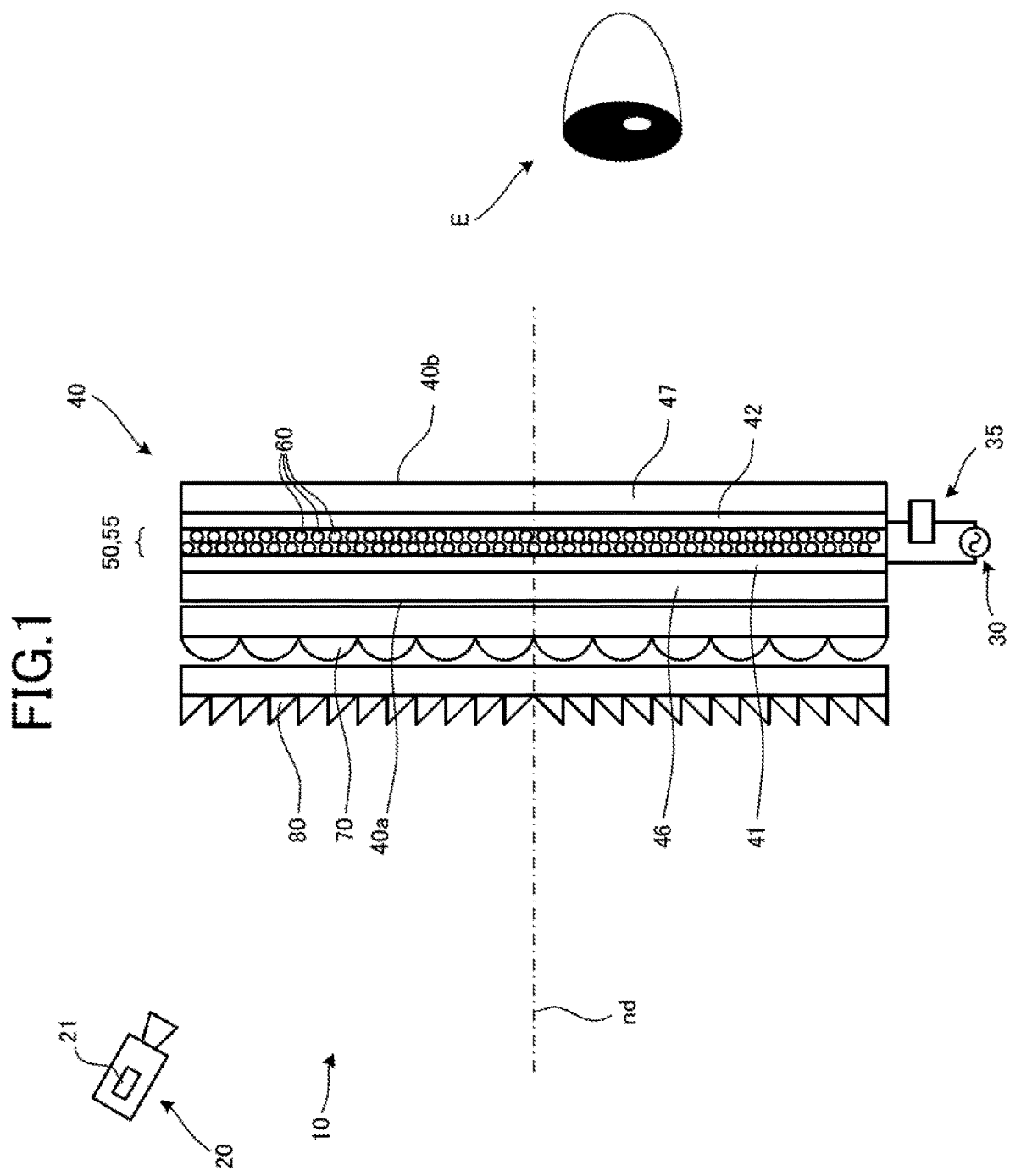
FIG. 1 illustrates a display apparatus according to the present embodiment.

FIG. 1 illustrates a display apparatus 10 according to the present embodiment.

The display apparatus 10 of transmission type according to the present embodiment includes a projector 20, a screen 40 to be irradiated with image light from the projector 20, a lenticular lens 70 arranged on the projector 20 side of the screen 40, a Fresnel lens 80 arranged on the projector 20 side of the lenticular lens 70, and non-illustrated black stripes. The lenticular lens 70 may be arranged on a second surface 40b side of the screen 40. A microlens array may be used instead of the lenticular lens 70. In such a case, a black matrix or a pinhole array may be used instead of the black stripes.

As will be described later, the screen 40 can temporally change its diffusion characteristic on incident light, whereby speckles can be made less noticeable. Concerning such a function of the screen 40, the display apparatus 10 includes a power source 30 and a control device 35. The power source 30 applies a voltage to the screen 40. The control device 35 adjusts the voltage applied from the power source 30 to control the state of the screen 40. The control device 35 may control an operation of the projector 20. For example, the control device 35 may be a general-purpose computer.

The projector 20 projects light for forming an image, i.e., image light on the screen 40. In the illustrated example, the projector 20 includes a coherent light source 21 which oscillates coherent light, and a non-illustrated scanning device which adjusts an optical path of the coherent light source 21. For example, the coherent light source 21 includes a laser light source for oscillating laser light. The coherent light source 21 may include a plurality of coherent light sources for generating light of different wavelength bands. In the case of the transmission type screen 40, an observer E can observe an image transmitted through the screen 40 from the side of a second surface 40b opposite from a first surface 40a where the coherent light source 21 is. The projector 20 may be configured to include a non-illustrated control portion different from the control device 35 and be controlled by the internal control portion.

Figure 2:
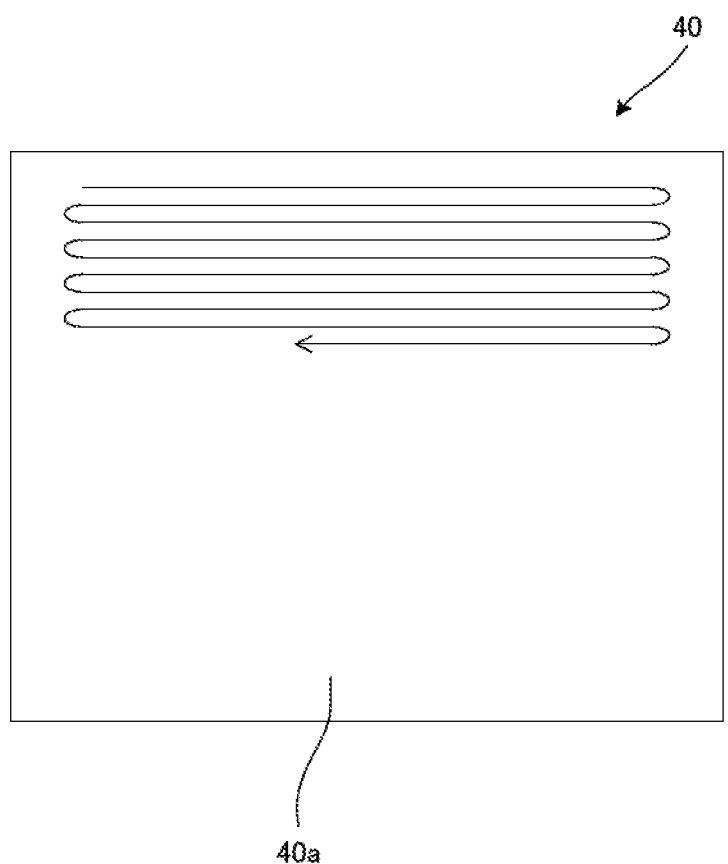
FIG. 2 illustrates a method for irradiating a screen of the display apparatus according to the present embodiment with light.

FIG. 2 illustrates a method for irradiating the screen of the display apparatus according to the present embodiment with light.

In the illustrated example, the projector 20 projects coherent light on the screen 40 by a raster scan method. As illustrated in FIG. 2, the projector 20 projects the coherent light to scan the entire area on the screen 40. The scanning is performed at high speed. The projector 20 stops the emission of the coherent light from the coherent light source 21 according to an image to be formed. In other words, the coherent light is projected only on positions to form the image on the screen 40. As a result, the image is formed on the screen 40. The operation of the projector 20 is controlled by the control device 35.

Figure 3:
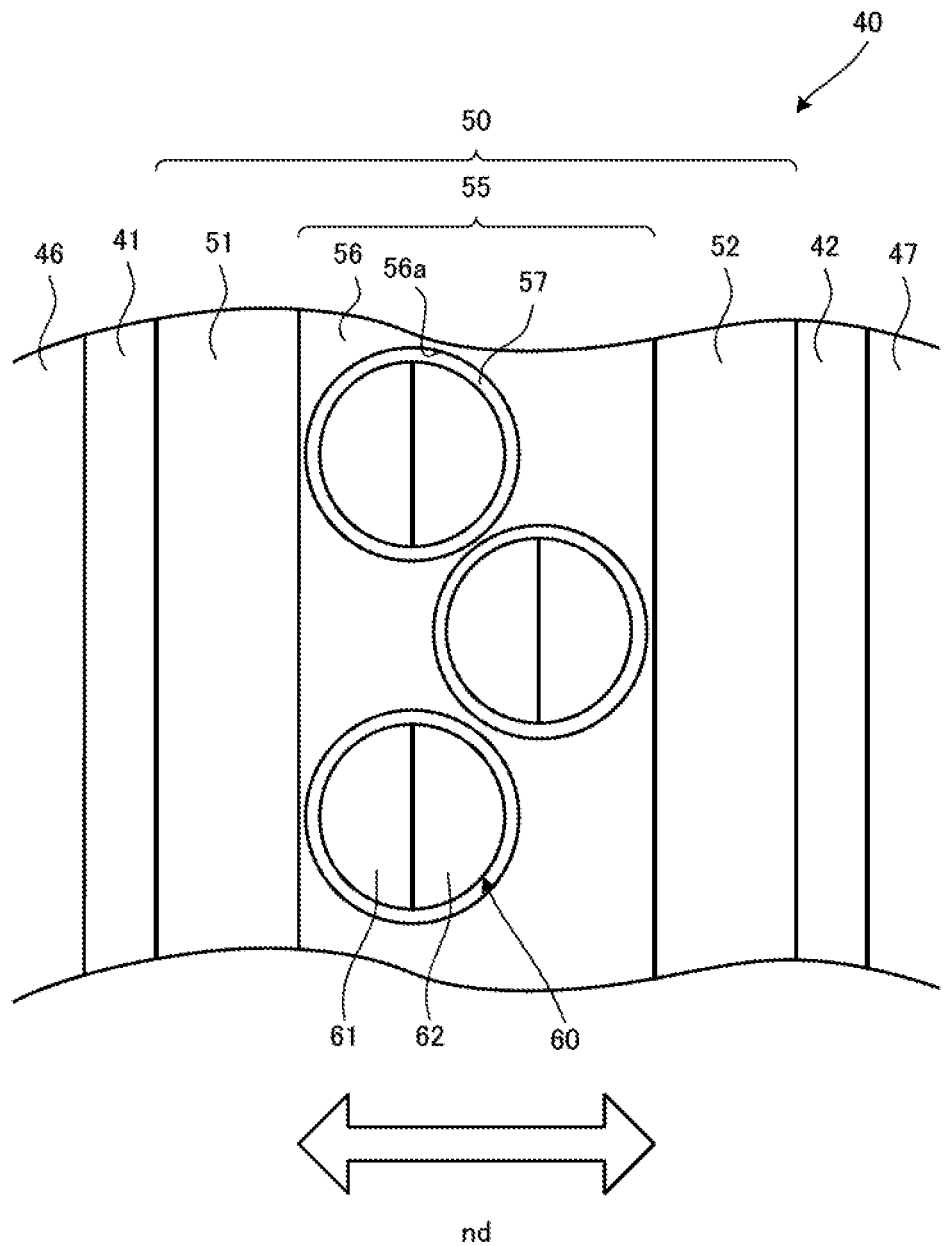
FIG. 3 illustrates a part of a cross section of the screen of the display apparatus according to the present embodiment.

FIG. 3 illustrates a part of a cross section of the screen of the display apparatus according to the present embodiment.

The screen 40 will initially be described. In the example illustrated in FIG. 3, the screen 40 includes an optical sheet 50 including a plurality of particles, and electrodes 41 and 42 connected to the power source 30. A first electrode 41 spreads flat over one main surface of the optical sheet 50. A second electrode 42 spreads flat over the other main surface of the optical sheet 50. The screen 40 illustrated in FIG. 3 includes a first cover layer 46 which covers the first electrode 41 to form one outermost surface of the screen 40, and a second cover layer 47 which covers the second electrode 42 to form the other outermost surface of the screen 40.

The first electrode 41, the first cover layer 46, the second electrode 42, and the second cover layer 47 for the image light to be transmitted through are preferably transparent and each have a transmittance of 80% or higher, more preferably 84% or higher, in the visible light region each. The visible light transmittance is determined as an average value of transmittances at respective wavelengths, measured in the range of measurement wavelengths of 380 nm to 780 nm by using a spectrophotometer ("UV-3100PC" made by Shimadzu Corporation, a product compliant with JIS K0115).

ITO (Indium Tin Oxide), InZnO (Indium Zinc Oxide), Ag nanowires, carbon nanotubes, and the like maybe used as a conductive material for forming the first electrode 41. The first cover layer 46 is a layer for protecting the first electrode 41 and the optical sheet 50. The first cover layer 46 may be made of a transparent resin, such as polyethylene terephthalate, which has excellent stability, polycarbonate, acrylic resin, methacrylic resin, or cycloolefin polymer. The second electrode 42 may be configured similarly to the first electrode 41. The second cover layer 47 may be configured similarly to the first cover layer 46.

The optical sheet 50 includes a pair of substrates 51 and 52, and a particle layer 55 arranged between the pair of substrates 51 and 52. The first substrate 51 supports the first electrode 41, and the second substrate 52 supports the second electrode 42. The particle layer 55 is sealed in between the first substrate 51 and the second substrate 52.

The first substrate 51 and the second substrate 52 are made of a material having a strength capable of sealing the particle layer 55 and functioning as a support for the first electrode 41, the second electrode 42, and the particle layer 55. For example, the first substrate 51 and the second substrate 52 are made of a polyethylene terephthalate resin film or the like. In the example illustrated in FIG. 3, the image light is transmitted through the first substrate 51 of the screen 40. The first substrate 51 therefore preferably is transparent and has a visible light transmittance similar to that of the first electrode 41 and the first cover layer 46. In particular, the second substrate 52 also preferably has a visible light transmittance similar to that of the first electrode 41 and the first cover layer 46.

The particle layer 55 includes a large number of particles 60 and a retaining part 56 for retaining the particles 60. The retaining part 56 retains the particles 60 in an operable manner. As illustrated in FIG. 3, the retaining part 56 includes a large number of cavities 56a, and the particles 60 are accommodated in the respective cavities 56a. Each cavity 56a has inner dimensions greater than outer dimensions of the particles 60 in the cavity 56a. The particles 60 can thus be operable in the cavities 56a. The retaining part 56 is swollen with liquid 57. In the cavities 56a, the gaps between the retaining part 56 and the particles 60 are filled with the liquid 57. The retaining part 56 swollen with the liquid 57 can stably ensure a smooth operation of the particles 60.

The liquid 57 is used to smoothen the operation of the particles 60. The liquid 57 is retained in the cavities 56a by the swelling of the retaining part 56 with the liquid 57. The liquid 57 preferably has low polarity so as not to hinder the particles 60 from operating in response to an electric field. Various materials for smoothing the operation of the particles 60 may be used as the low polarity liquid 57. For example, dimethyl silicone oil, isoparaffin liquids, straight-chain alkanes, and the like may be used as the liquid 57.

For example, an elastomer sheet and the like made of an elastomer material may be used as the retaining part 56. The retaining part 56 made of an elastomer sheet can be swollen with the liquid 57. For example, silicone resin, (slightly crosslinked) acrylic resin, (slightly crosslinked) styrene resin, polyolefin resin, and the like may be used as the material of the elastomer sheet.

The particles 60 have a function of changing the traveling direction of the image light projected from the projector 20 illustrated in FIG. 1, for example, a function of diffusing, reflecting, or refracting the image light. The particles 60 include a first portion 61 and a second portion 62 having different dielectric constants. If the particles 60 are placed in an electric field, electric dipole moment thus occurs in the particles 60. Here, the particles 60 operate toward a position where the vector of the dipole moment is reverse to the vector of the electric field.

If a voltage is applied between the first electrode 41 and the second electrode 42 and an electric field occurs in the optical sheet 50 lying between the first electrode 41 and the second electrode 42, the particles 60 operate in the cavities 56a into an orientation stable with respect to the electric field, i.e., a position and direction stable with respect to the electric field. The screen 40 changes its diffusion wavefront according to the operation of the particles 60 having a light diffusion function.

For example, the control device 35 can repeatedly rotate the particles 60 within an angular range of less than 180° by controlling the applied voltage from the power source 30. At least either one of the first portion 61 and the second portion 62 can thus be selectively positioned on the observer side.

The control device 35 can also control at least either one of the direction and position of each particle 60 by using the applied voltage from the power source 30 so that the first portion 61 of the particle 60 covers at least part of the second portion 62 from the observer side along a normal direction of the screen 40. Consequently, even if the first portion 61 and the second portion 62 do not have exactly the same color, a change in the color tone of the screen 40 can be effectively made less perceptible while an image is displayed with the particles 60 in operation.

The particles 60 including the first portion 61 and the second portion 62 having different dielectric constants can be manufactured by various methods including known techniques. For example, a method for arranging organic or inorganic spherical particles in a single layer by using an adhesive tape or the like, and evaporating a layer of positively and negatively charged resin components or an inorganic layer different from the spherical particles on the hemispherical surfaces (evaporation method; for example, see JP 56-67887 A), a method using a rotating disk (for example, see JP 6-226875 A), a method for bringing two types of liquid droplets having different dielectric constants into contact in the air by using a spray method or inkjet method (for example, see JP 2003-140204 A), a microchannel method (for example, see JP 2004-197083 A), and the like are used.

As proposed in JP 2004-197083 A, the first portion 61 and the second portion 62 having different dielectric constants can be formed by using materials having different charging characteristics. In general, the microchannel method uses a continuous phase and a particle forming phase which have an oil-based/water-based (O/W type) or water-based/oil-based (W/O type) relationship with each other. A continuous phase containing two types of materials having different charging characteristics is sequentially discharged from a first microchannel for transporting the continuous phase into a particle forming phase of a moving medium flowing in a second microchannel, whereby two-phase polymer particles 60, or dipolar particles 60, having (±) charge polarities are manufactured.

In a microchannel method according to the present embodiment, a continuous phase is initially formed by separating, in an oil- or water-based moving medium containing polymeric resin components, polymeric resin components insoluble to the medium. The polymeric resin components in the continuous phase are made of mutually-different positively and negatively charged polymeric monomers. Next, the polymeric monomers are transported to a first microchannel, and then the continuous phase is sequentially discharged, either continuously or intermittently, into a water- or oil-based particle forming phase flowing through a second microchannel. Since the article discharged into the particle forming phase forms particles in the course of discharge, distribution, and transportation in the microchannel, the polymeric resin components in the particles are then polymerized and cured by UV irradiation and/or heating. In such a manner, the particles 60 are prepared as appropriate.

Among the polymeric resin components used for the particles 60 are monomer species that have a tendency to exhibit (−) chargeability and (+) chargeability, respectively, depending on the type of functional group or substituent. If at least two or more, a plurality of types of monomers is used as the polymeric resin components, a plurality of monomers, preferably ones having a tendency toward the same type of chargeability, are then suitably used in combination as appropriate by making the tendencies to exhibit (+) chargeability and (−) chargeability publicly known. Additives other than the monomers, like a polymerization initiator, are prepared and added so that the entire material will not lose chargeability.

If the polymeric resin components contain at least one type of functional group and/or substituent, examples of the functional group or substituent may include a carbonyl group, a vinyl group, a phenyl group, an amino group, an amide group, an imide group, a hydroxyl group, a halogen group, a sulfonate group, an epoxy group, and a urethane bond. Monomer species including such a functional group or substituent of polymeric monomer may be suitably used singly or in combination of two types or more as appropriate. Polymeric monomers proposed in JP 2004-197083 may be used as the ones having a tendency to exhibit (−) chargeability or (+) chargeability.

In manufacturing the particles 60 by the microchannel method, the outer shape of the resulting particles 60, the shape of the interface between the first portion 61 and the second portion 62 in each particle 60, and the like can be adjusted by adjusting the speeds, merging directions, and the like of the two types of polymeric resin components constituting the continuous phase during merging, and the speed, discharge direction, and the like of the continuous phase during discharge into the particle forming phase.

In the examples of the particles 60 illustrated in FIG. 3, the first portion 61 and the second portion 62 have the same volume ratios. The interface between the first portion 61 and the second portion 62 in the particles 60 is formed in a flat shape. In other words, the particles 60 are formed in a spherical shape, and the first portion 61 and the second portion 62 are formed in a hemispherical shape.

Figure 4:
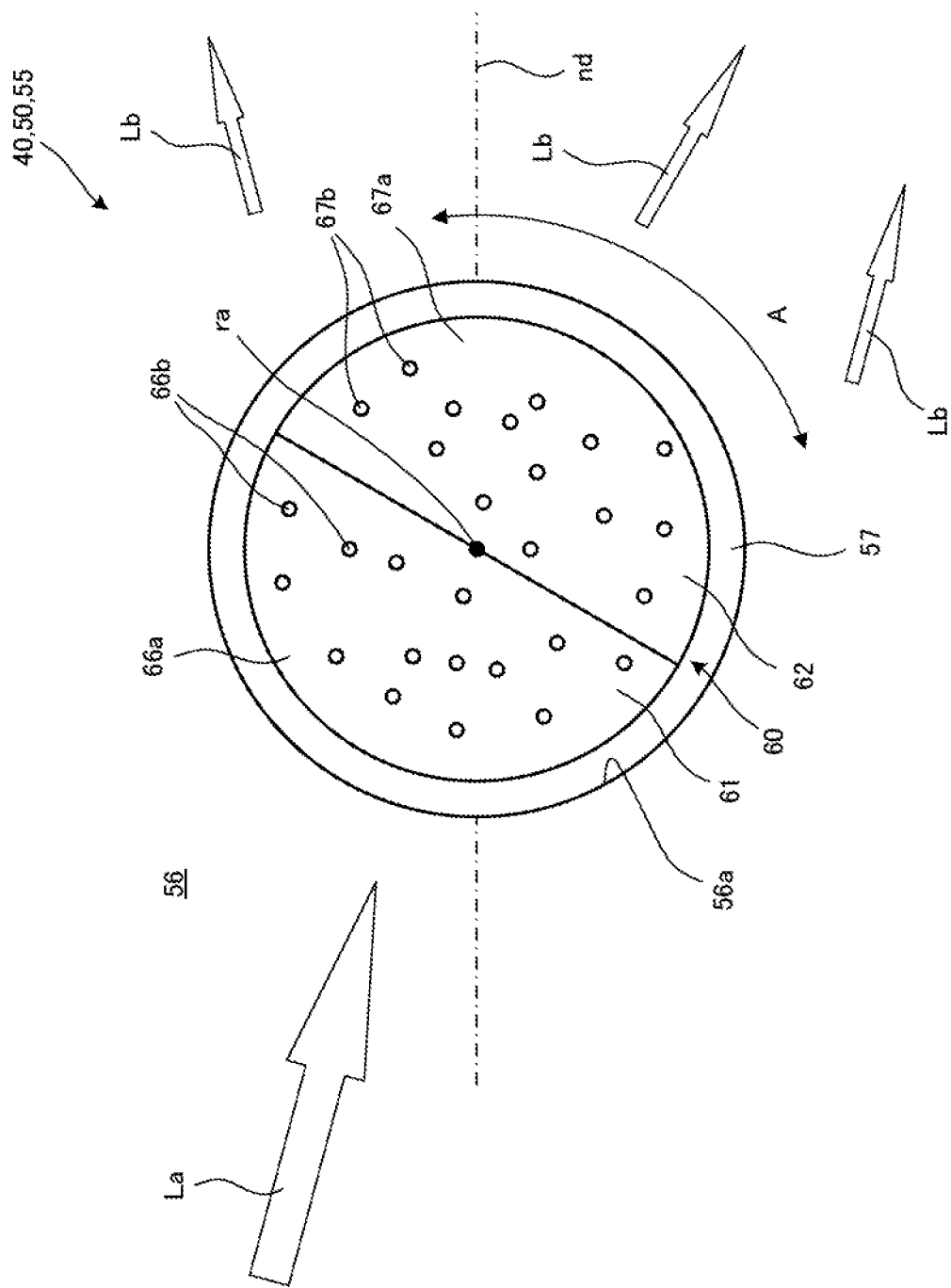
FIG. 4 illustrates an operation of a particle in a particle layer of the screen according to the present embodiment.

FIG. 4 illustrates a particle 60 in the particle layer 55 of the screen 40 according to the present embodiment.

If the two types of polymeric resin components constituting the continuous phase include diffusion components, an internal diffusion function can be given to the first portion 61 and the second portion 62 of the particle 60. As illustrated in FIG. 4, the first portion 61 of the particle 60 includes a first main portion 66a and first diffusion components 66b distributed in the first main portion 66a. Similarly, the second portion 62 of the particle 60 includes a second main portion 67a and second diffusion components 67b distributed in the second main portion 67a.

That is, the spherical particle 60 illustrated in FIG. 4 can exert a diffusion function on light traveling through the first portion 61 and light traveling through the second portion 62. Here, the first diffusion components 66b and the second diffusion components 67b refer to components that can act on light traveling through the particle 60 to change the traveling direction of the light by reflection, refraction, etc. For example, such a light diffusion function of the first diffusion components 66b and the second diffusion components 67b is provided by making the first diffusion components 66b and the second diffusion components 67b of a material having a refractive index different from that of the material constituting the first main portion 66a and the second main portion 67a of the particle 60, or by making the first diffusion components 66b and the second diffusion components 67b of a material that can cause reflection of the light.

Examples of the first diffusion components 66b and the second diffusion components 67b having a refractive index different from that of the material constituting the first main portion 66a and the second main portion 67a include resin beads, glass beads, metal compounds, and gas-containing porous substances. The first diffusion components 66b and the second diffusion components 67b may simply be air bubbles.

The particles 60 preferably have a single color. In other words, the first portion 61 and the second portion 62 preferably have the same color. The colors of the first portion 61 and the second portion 62 can be adjusted by adding coloring materials such as a pigment and dye. Pigments and dyes disclosed in JP 2005-99158 A, Japanese Patent No. 2780723, Japanese Patent No. 5463911, and the like may be used.

The single color used for the particles 60 means that even if the particles 60 operate in the optical sheet 50 without an image displayed on the screen 40, the particles 60 have uniform color such that the observer observing the screen 40 illustrated in FIG. 1 with normal observation power is not able to perceive a change in the color of the screen 40. In other words, if the second surface 40b of the screen 40 in a state where the first portions 61 of the particles 60 face the first surface 40a of the screen 40 and the second surface 40b of the screen 40 in a state where the second portions 62 of the particles 60 face the first surface 40a of the screen 40, without an image displayed, are observed by the observer with normal observation power and perceived to have the same color, the particles 60 have a single color.

Specifically, the second surface 40b of the screen 40 in the state where the first portions 61 of the particles 60 face the first surface 40a of the screen 40 and the second surface 40b of the screen 40 in the state where the second portions 62 of the particles 60 face the first surface 40a of the screen 40 preferably have a color difference $\Delta E^*ab$ $(=[(\Delta L^*)^2+(\Delta a^*)^2+(\Delta b^*)^2]^{1/2})$ of 1.5 or less. The color difference $\Delta E^*ab$ is a value determined based on lightness $\Delta L^*$ and chromaticities $a^*$ and $b^*$ measured by using a colorimeter (CM-700d) made by KONICA MINOLTA, INC., in conformity with JIS Z8730. Evaluation is made in terms of the value of the color difference $\Delta E^*ab$ determined based on the lightness $\Delta L^*$ and chromaticities $a^*$ and $b^*$ of transmitted light.

Since the particles 60 have a single color, the color of the screen 40 can be made constant when no image is displayed. When an image is to be displayed on the screen 40, a change in color tone is less likely to be perceived. As a result, deterioration in image quality due to a color change of the screen 40 can be effectively avoided.

For example, the particle layer 55, the optical sheet 50, and the screen 40 are manufactured as described below.

For example, the particle layer 55 can be manufactured by a method disclosed at JP 1-28259 A. Ink is initially formed by distributing particles 60 in polymeric silicone rubber. Next, the ink is spread over a flat substrate by a coater or the like, and polymerized into a sheet by heating, drying, etc. By such a procedure, the retaining part 56 retaining the particles 60 is obtained. Next, the retaining part 56 is immersed in liquid 57, such as a silicone oil, for a certain period. The retaining part 56 is then swollen to form gaps filled with the liquid 57, between the retaining part 56 made of silicon rubber or the like and the particles 60. This forms cavities 56a accommodating the liquid 57 and the particles 60, whereby the particle layer 55 is manufactured.

Next, the screen 40 is manufactured by using the particle layer 55 by a manufacturing method disclosed in JP 2011-112792 A. The particle layer 55 is initially covered with the pair of first and second substrates 51 and 52 illustrated in FIG. 4. The particle layer 55 is sealed by using lamination, an adhesive, or the like. The optical sheet 50 is thereby manufactured. Next, a first electrode 41 and a second electrode 42 are arranged on the optical sheet 50. A first cover layer 46 and a second cover layer 47 are further stacked thereon, whereby the screen 40 is obtained.

A large-sized optical sheet 50 and screen 40 can be easily manufactured by using such a method.

Next, a relationship between the first and second main portions 66a and 67a and the first and second diffusion components 66b and 67b of the particle 60 will be described.

The first diffusion components 66b and the second diffusion components 67b preferably have a diameter d that satisfies the following conditional expression (1):

$$0.1 \ \mu m < d < 15 \ \mu m. \tag{1}$$

If the diameter of the first diffusion components 66b and the second diffusion components 67d is 0.1 μm or less, the scattering characteristic varies greatly between R, G, and B colors of the laser projector due to the effect of Rayleigh scattering. For example, the degree of scattering increases in order of short-wavelength blue, green, and red. The screen 40 using such particles can cause color unevenness, for example, at locations such as the center and four corners, or depending on the angle of viewing.

If the diameter of the first diffusion components 66b and the second diffusion components 67b is 15 μm or more, the large size of the diffusion components with respect to the particles 60 can cause variations in the volume ratio of the diffusion components particle by particle, or hinder the particles 60 from maintaining the spherical shape. If the diameter of the particles 60 is too large, a particle-to-particle distance increases and can cause through light which is light emitted from the projector and reflected or transmitted without impinging on any particle in the particle layer 55. The diameter of the particles 60 is thus preferably as small as possible. As the diameter d of the diffusion components increases, the curvature of the interfaces between the main portions and the diffusion components decreases. This reduces the angle at which the traveling direction of the light is curved by refraction, and is disadvantageous in terms of the speckle reduction effect. For the foregoing reasons, the diameter of the first diffusion components 66b and the second diffusion components 67b is desirably 15 μm or less. If the diameter d of the diffusion components is large, the light is diffused by the refraction at the interfaces between the main portions and the diffusion components. According to a simulation to be described later, the calculation results of geometrical optics and Mie scattering are known to coincide if d is sufficiently large.

A volume fraction Vi indicating the proportion of the sum of the volumes of the first diffusion components 66b and the second diffusion components 67b to the volume of the particle 60 preferably satisfies the following conditional expression (2):

$$Vi \geq 3\% \tag{2}$$

A refractive index difference Δn between the first and second diffusion components 66b and 67b and the first and second main portions 66a and 67a preferably satisfies the following conditional expression (3):

$$|\Delta n| \leq 0.2 \tag{3}$$

Now, a simulation by which the conditional expression (2) of the volume fraction and the conditional expression (3) of the refractive index difference are determined will be described.

Figure 5:
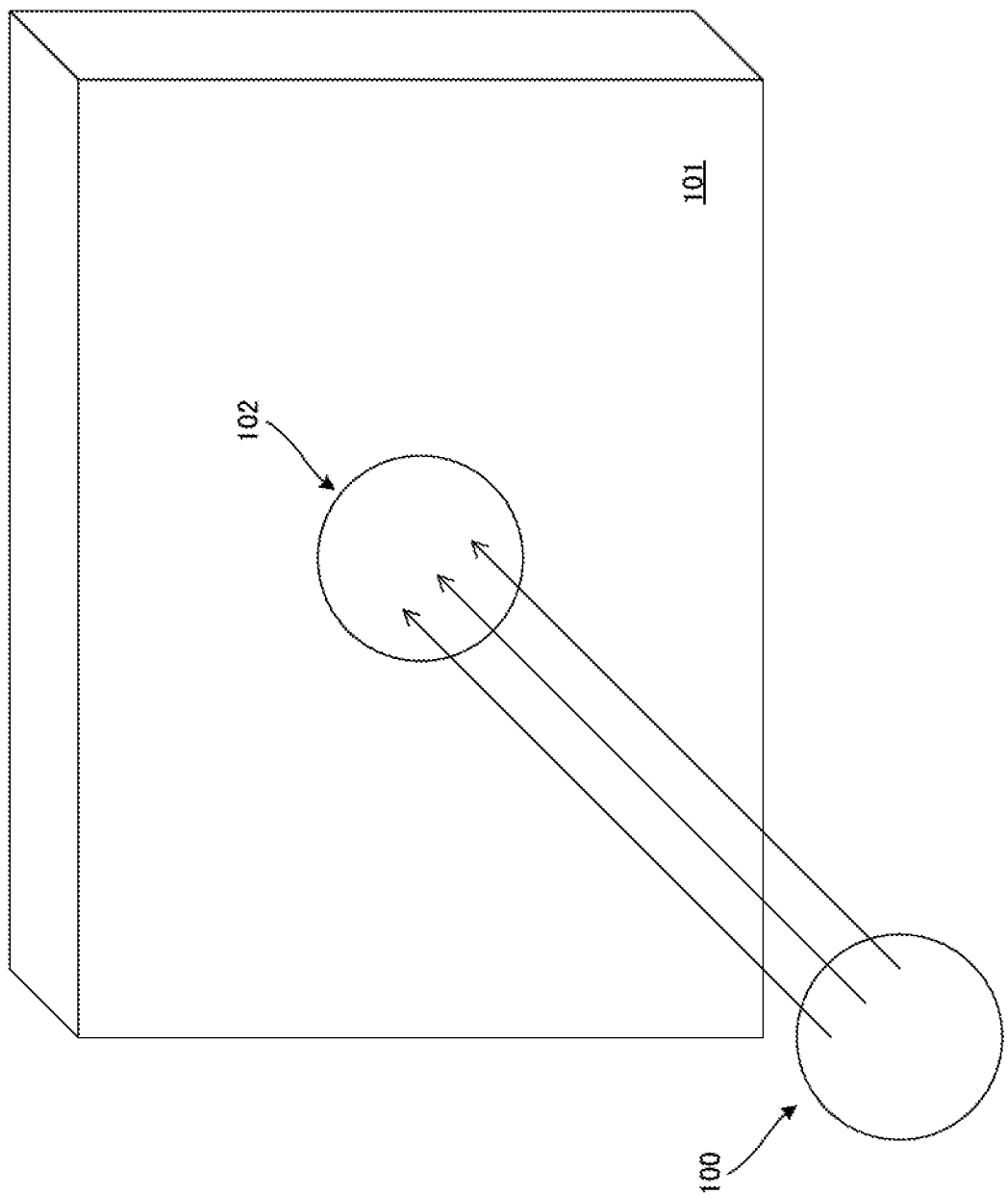
FIG. 5 illustrates a simulation model.

FIG. 5 illustrates a simulation model.

The simulation model includes a rectangular solid 101 simulating the retaining part 56 and a cavity 57 illustrated in FIG. 3, and a sphere 102 simulating a particle 60 embedded in the rectangular solid 101. The rectangular solid 101 has a thickness of 144 μm. The refractive index of the rectangular solid 101 with respect to a wavelength of 550 nm is 1.4. The sphere 102 has a diameter of 90 μm and is assumed to be acrylic resin. The rectangular solid 101 is irradiated with a parallel beam of a wavelength of 550 nm from a circular light source 100 having a diameter of 89.98 μm. Reflection or transmittance at each interface follows the Fresnel reflection. The beam is not split, and either reflection or transmission is selected in a stochastic manner. The cavity 57 is filled with silicone oil, and the silicone oil and the silicone rubber constituting the retaining part 56 have almost the same refractive indexes. The cavity 57 is thus omitted in the model.

The particle number density, refractive index, optical density, or particle size of the sphere 102 was set on the assumption that diffusion followed the Mie scattering. The particle number density (unit: /mm$^3$) was calculated and set in advance from the volume fraction. The refractive index was set to 1.43, the optical density 10000, and the particle sizes of all particles 1000 nm. Since the converted transmittance is $10^{-10000}$, a beam incident on the sphere 102 is considered to be absorbed. That is, a beam received at infinity from the system here is one that is emitted from the rectangular solid 101 without being incident on the sphere 102 at all. Such a beam does not contribute to speckle reduction, and is desirably reduced as much as possible.

Figure 6:
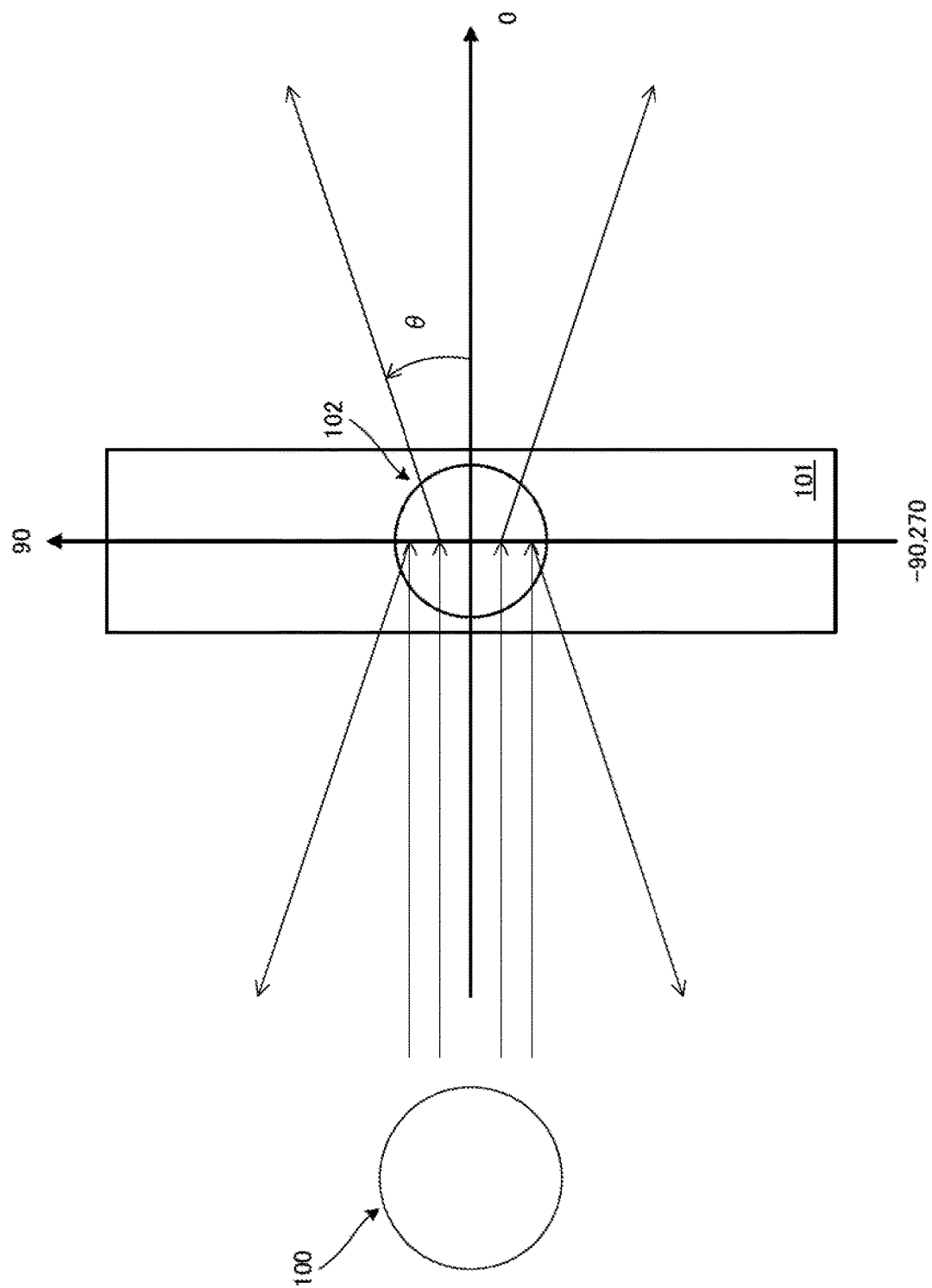
FIG. 6 illustrates a definition of scattered light in the simulation.
Figure 7:
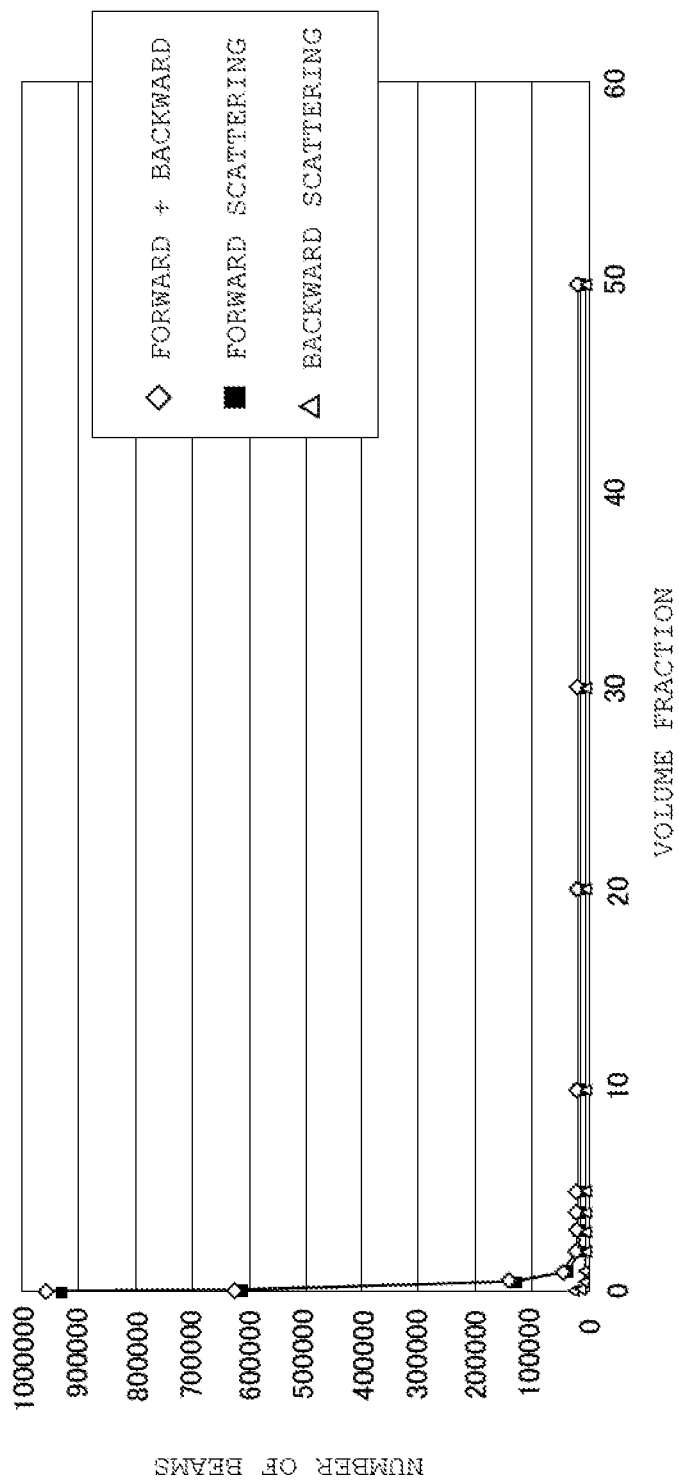
FIG. 7 illustrates results of scattering with respect to a volume fraction in the simulation.

FIG. 6 illustrates the definition of scattered light in the simulation. FIG. 7 illustrates a result of scattering with respect to the volume fraction in the simulation.

As illustrated in FIG. 6, with the direction of emission from the light source 100 to the sphere 102 as 0° and with the counterclockwise direction as positive, the scattered light of −90°<θ<90° will be referred to as forward scattering, and 90°<θ<270° as backward scattering.

FIG. 7 illustrates the result of scattering of 1,000,000 incident beams (550 nm in wavelength) with respect to the volume fraction of the sphere 102. As illustrated in FIG. 7, if the volume fraction is less than 3%, a lot of beams are calculated to be received at infinity. Since such beams do not contribute to speckle reduction, the volume fraction Vi preferably satisfies the conditional expression (2) of being 3% or more.

Figure 8:
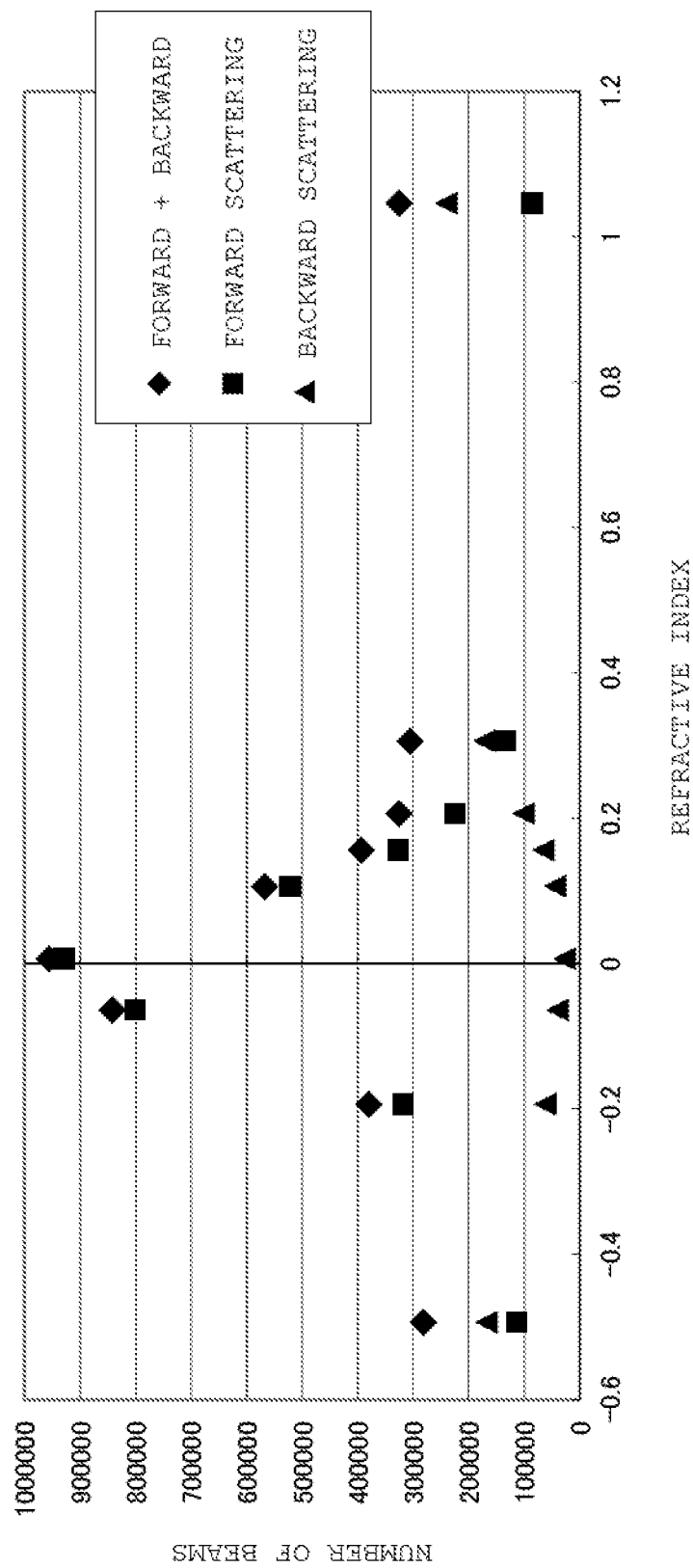
FIG. 8 illustrates results of scattering with respect to a refractive index difference in the simulation.

FIG. 8 illustrates the results of scattering with respect to the refractive index difference in the simulation.

Next, calculations were performed by changing the refractive index, with a volume fraction of 3% and a transmittance of 100%. As illustrated in FIG. 8, if the refractive index difference $|\Delta n|$ is smaller than 0.2, i.e., the conditional expression (3) is satisfied, the forward scattering exceeds the backward scattering, and the transmitted beams increase. For example, if the rectangular solid 101 is made of silicone rubber, the sphere 102 may be made of an inorganic material such as silica, or an organic material such as polystyrene.

Next, an operation when an image is displayed by using the display apparatus 10 illustrated in FIG. 1 will be described.

Initially, the coherent light source 21 of the projector 20 oscillates coherent light under the control of the control device 35. The optical path of the light from the projector 20 is adjusted by the non-illustrated scanning device, and the screen 40 is irradiated with the light via the lenticular lens 70 and the Fresnel lens 80. The scanning device adjusts the optical path so that the screen 40 is scanned with the light as illustrated in FIG. 2. The emission of the coherent light from the coherent light source 21 is controlled by the control device 35. The control device 35 stops the emission of the coherent light from the coherent light source 21 according to the image to be displayed on the screen 40. The operation of the scanning device included in the projector 20 is so fast that the operation is not resolvable by the human eye E. The observer thus simultaneously observes the light projected on various positions on the screen 40, irradiated at separate times.

The light projected on the screen 40 is transmitted through the first cover layer 46 and the first electrode 41 to reach the optical sheet 50. This light is diffused and reflected by the particles 60 of the optical sheet 50 and emitted in various directions on the observer side of the screen 40. The observer can thus observe the reflected light from each position on the screen 40, at various positions on the observer side of the screen 40. Consequently, the observer can observe an image corresponding to the area irradiated with the coherent light on the screen 40.

The coherent light source 21 may include a plurality of light sources that emit coherent light of mutually different wavelength bands. In such a case, the control device 35 controls the light source corresponding to light of each wavelength band independently of the other light sources. As a result, a color image can be displayed on the screen 40.

In general, if an image is formed on a screen by using coherent light, a dotted pattern of speckles is observed. One of the causes of the speckles is considered to be that the coherent light, typified by laser light, diffused over the screen produces an interference pattern on the optical sensor surface or, in the case of human beings, on the retinas. In particular, if the screen is irradiated with coherent light by raster scanning, the coherent light is incident on each position on the screen in a constant direction of incidence. If raster scanning is used, the speckle wavefront occurring at each point of the screen remains fixed unless the screen swings. The speckle pattern, when observed with an image by the observer, significantly deteriorates the image quality of the display image.

By contrast, the screen 40 of the display apparatus 10 according to the present embodiment is configured to temporally change the diffusion wavefront. As the diffusion wavefront of the screen 40 changes, the speckle pattern on the screen 40 changes temporally. If the temporal change of the diffusion wavefront is made sufficiently high in speed, speckle patterns are superposed and averaged. This can make the speckles not noticeable to the observer.

As illustrated in FIG. 1, the screen 40 includes the pair of first and second electrodes 41 and 42. The first electrode 41 and the second electrode 42 are electrically connected to the power source 30. In other words, the power source 30 can apply a voltage to the first electrode 41 and the second electrode 42. If a voltage is applied between the first electrode 41 and the second electrode 42, an electric field is formed in the optical sheet 50 lying between the first electrode 41 and the second electrode 42.

As illustrated in FIG. 4, the particles 60 including the first portion 61 and the second portion 62 having different dielectric constants are operably retained in the particle layer 55 of the optical sheet 50. Since the particles 60 are charged in the first place, or at least cause dipole moment when an electric field is formed, the particles 60 operate according to the vector of the electric field formed. As the particles 60 having a function of changing the traveling direction of light, such as a reflection function and a diffusion function, operate to rotate in the direction of the arrow A illustrated in FIG. 4, the diffusion characteristic of the screen 40 changes temporally. This can make the speckles not noticeable to the observer.

The arrow La of FIG. 4 represents the image light projected onto the screen 40 from the projector 20. The arrows Lb represent image light diffused by the screen 40. That the first portion 61 and the second portion 62 of the particle 60 have different dielectric constants may refer to that the dielectric constants are different enough to exert a speckle reducing function. Whether the first portion 61 and the second portion 62 of the particle 60 have different dielectric constants can thus be determined based on whether the operably-retained particle 60 can operate according to a change of the electric field vector.

The principle of operation of the particles 60 with respect to the retaining part 56 is that the particles 60 change in direction and position so that the charges or the dipole moment of the particles 60 comes to a positional relationship stable with respect to the electric field vector. If a constant electric field is continuously applied to the particle layer 55, the particles 60 therefore stop operating after a certain period of time. On the other hand, to make speckles not noticeable, the operation of the particles 60 with respect to the retaining part 56 needs to be continued. The power source 30 then applies a voltage so that the electric field formed in the particle layer 55 changes temporally. In the present embodiment, the power source 30 applies a voltage between the first electrode 41 and the second voltage 42 so that the vector of the electric field generated in the optical sheet 50 is reversed.

Figure 9:
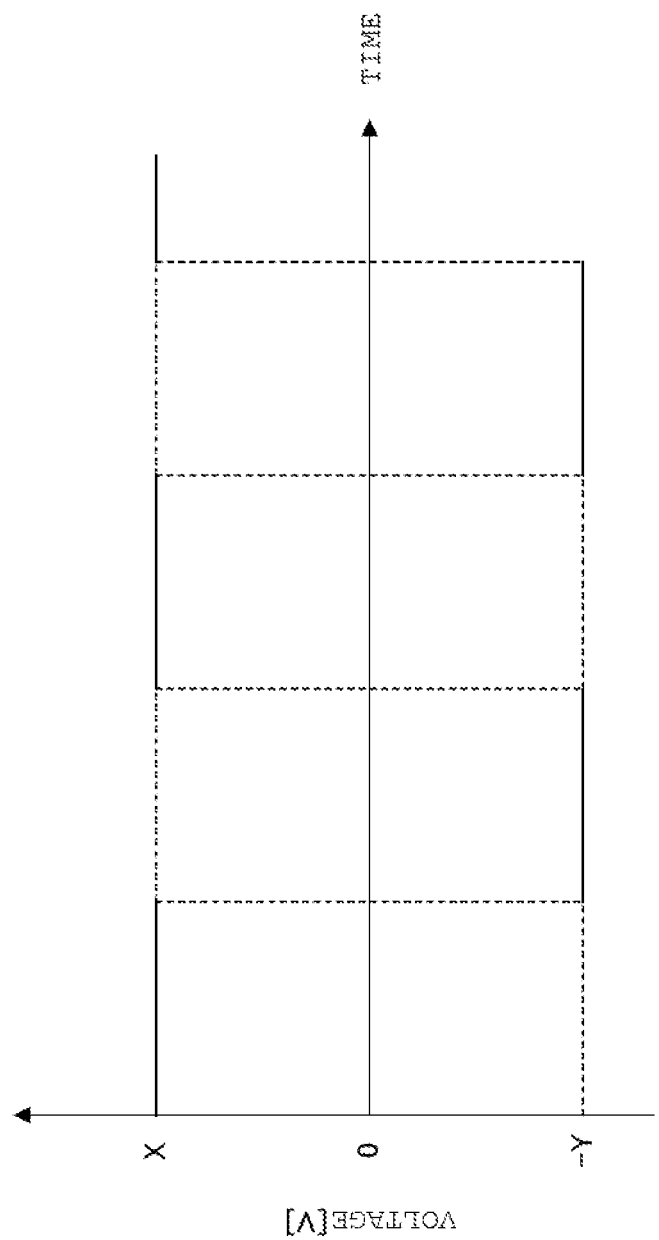
FIG. 9 illustrates an example of a voltage applied to the screen.

FIG. 9 illustrates an example of the voltage applied to the screen.

As illustrated in FIG. 9, voltages of X [V] and −Y [V] are alternately applied between the first electrode 41 and the second electrode 42 according to the present embodiment. The applied voltages of X [V] and −Y[V] may have the same or different absolute values. Voltages of three or more different values may be applied. An applied voltage may change continuously, like when an ordinary alternating-current voltage is employed.

The particles 60 are accommodated in the cavities 56a formed in the retaining part 56. As illustrated in FIG. 4, the particles 60 have a substantially spherical outer shape. The cavities 56a to accommodate the particles 60 have a substantially spherical inner shape. The particles 60 can thus rotate and vibrate about a rotation axis ra extending in a direction perpendicular to the plane of FIG. 4. Note that the particles 60 can make not only repetitive rotational movements but also translational movements depending on the size of the cavities 56a accommodating the particles 60. The cavities 56a are filled with the liquid 57. The liquid 57 smoothens the operation of the particles 60 with respect to the retaining part 56.

Figure 10:
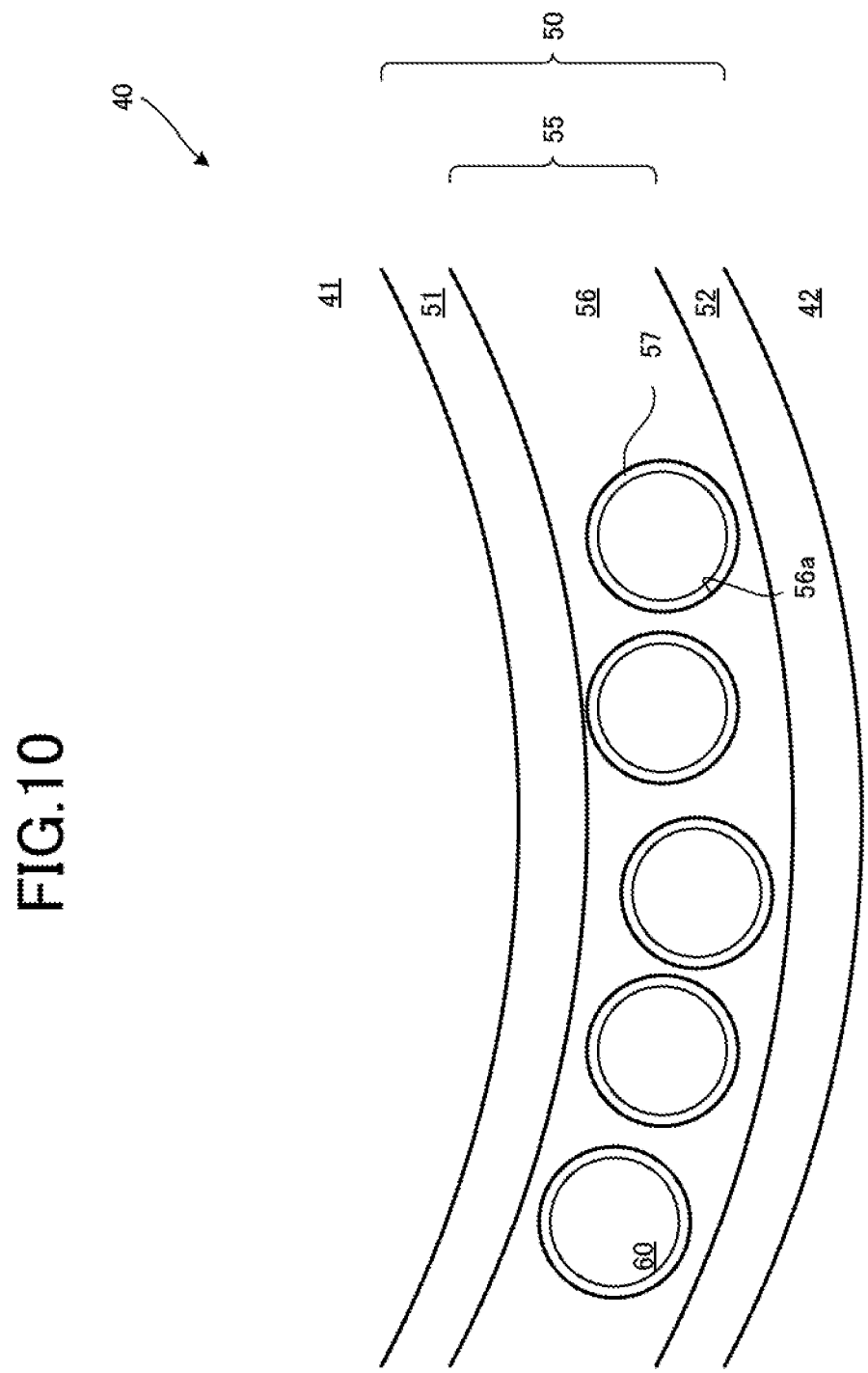
FIG. 10 illustrates a part of a cross section of a screen according to another embodiment.

FIG. 10 illustrates a part of a cross section of the screen 40 according to another embodiment.

As illustrated in FIG. 10, the optical sheet 50 and the screen 40 may be manufactured to a curved surface. To manufacture the optical sheet 50 and the screen 40 to a curved surface, the particle layer 55 may be heated and polymerized on a curved surface during sheet formation. Then, the substrates 51 and 52 formed to the curved surface in advance may be stacked thereon.

Figure 11:
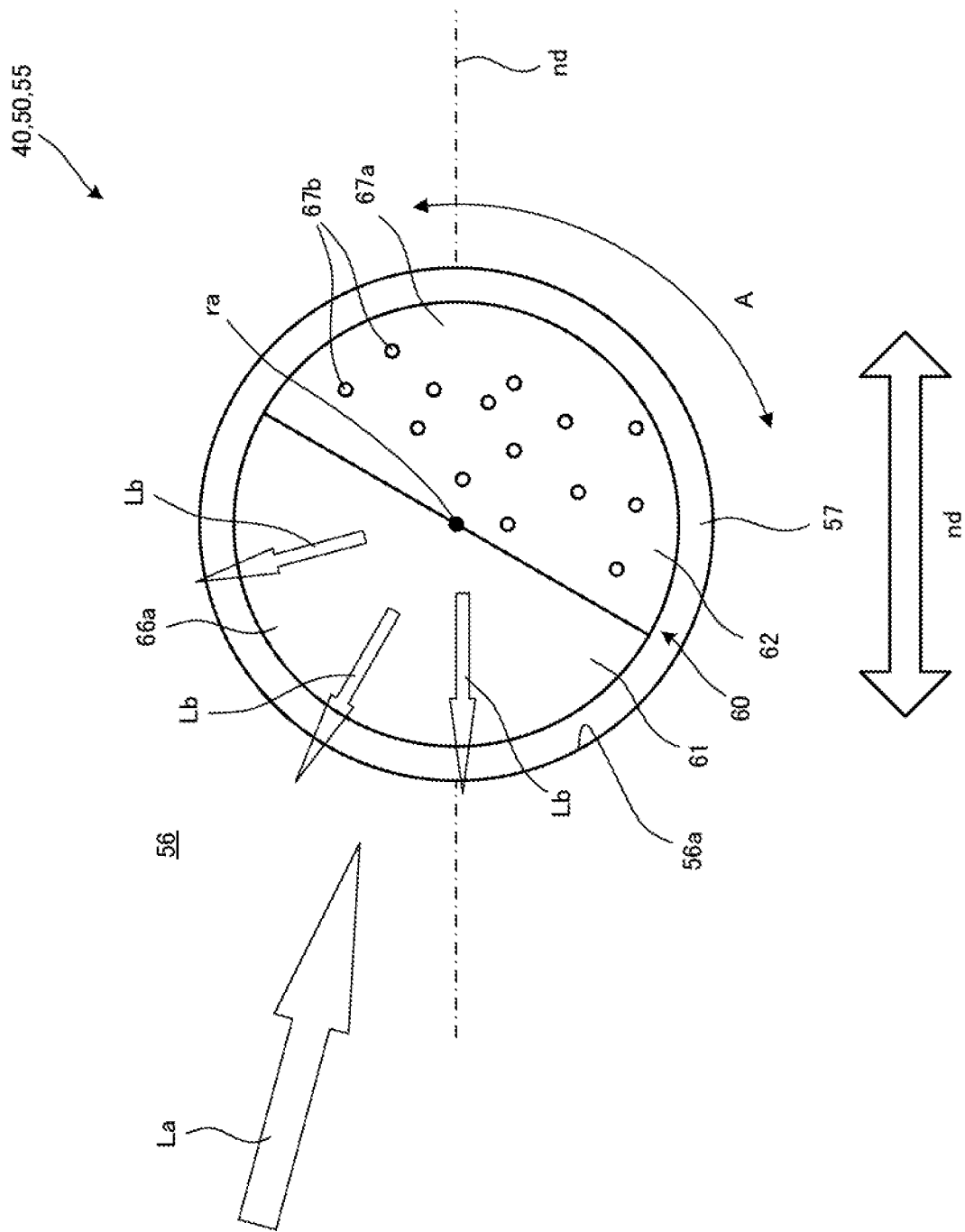
FIG. 11 illustrates a particle in an example where a first portion and a second portion have different colors.

FIG. 11 illustrates a particle 60 in an example where the first portion 61 and the second portion 62 have different colors.

For example, in the foregoing embodiment, only either one of the first and second portions 61 and 62 may include diffusion components. If only either one of the first and second portions 61 and 62 includes diffusion components, transmitted light is likely to be diffused by the diffusion components even when the particle 60 changes in direction, orientation, or position. This can effectively make speckles not noticeable.

Figure 12:
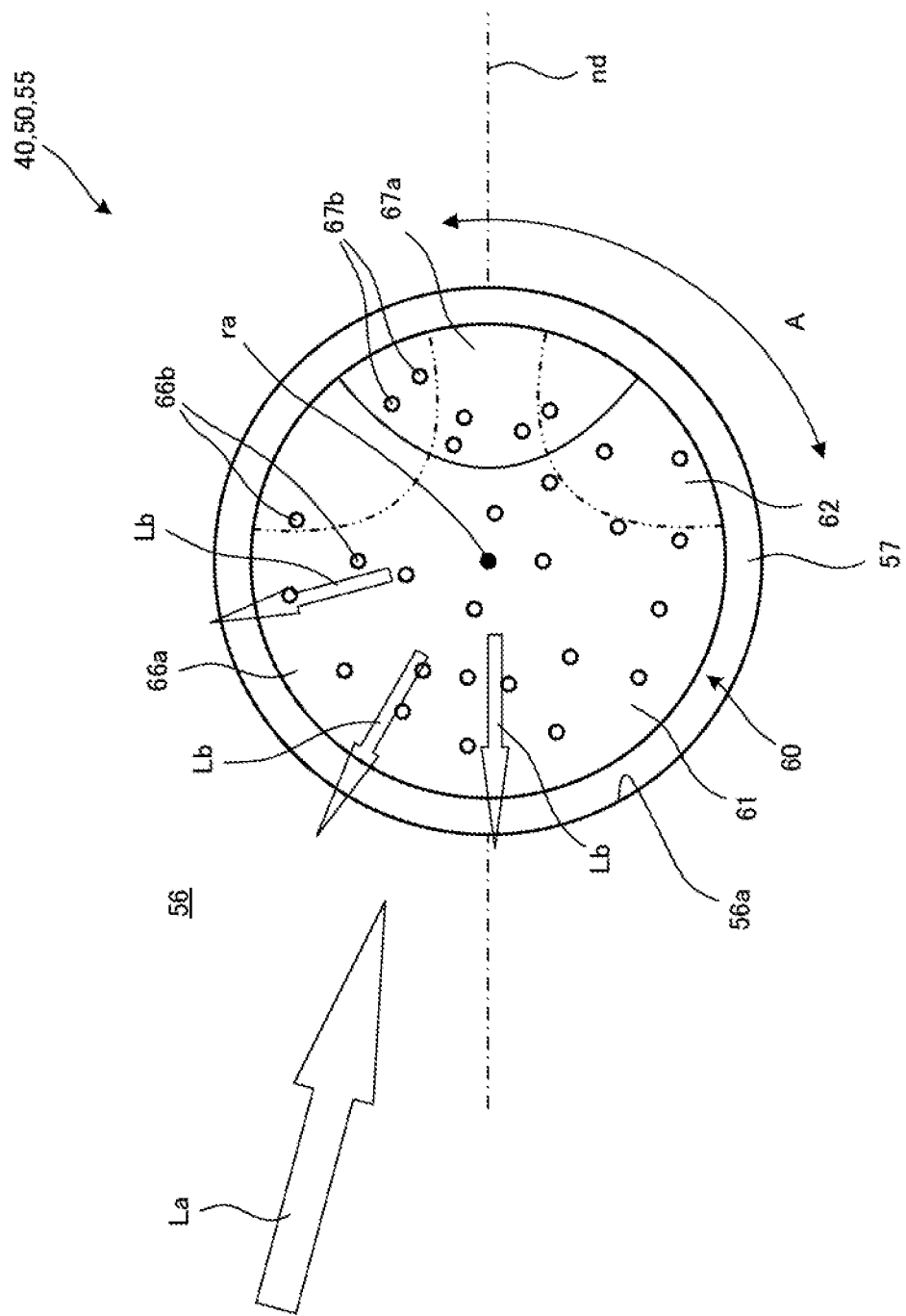
FIG. 12 illustrates a particle in an example where the first portion and the second portion have different volume ratios.

FIG. 12 illustrates a particle 60 in an example where the first portion 61 and the second portion 62 have different volume ratios.

The foregoing embodiment has described an example where the first portion 61 and the second portion 62 have the same volume ratios. However, such an example is not restrictive. The volume ratio of the first portion 61 in a particle 60 may be different from the volume ratio of the second portion 62 in the particle 60. In the example illustrated in FIG. 12, the volume ratio of the first portion 61 is higher than that of the second portion 62. If such a particle 60 is used, the first portion 61 can easily cover at least part of the second portion 62 from the observer side along a normal direction nd of the screen while the screen 40 is irradiated with light. If the second portion 62 moves to a position indicated by a two-dotted dashed line in FIG. 13 according to the rotating operation of the particle 60, the first portion 61 can fully cover the second portion 62 from the observer side along the normal direction nd of the screen 40. Even if the first portion 61 and the second portion 62 do not have exactly the same color, a change in the color tone of the screen 40 can thus be effectively made less perceptible while an image is displayed with the particles 60 in operation.

The foregoing embodiment has described an example where single-color particles 60 are fabricated from a monomer having positive chargeability and a monomer having negative chargeability by using synthetic resin polymerization, and the particles 60 are charged. However, such an example is not restrictive. Particles 60 including a plurality of portions having different charging characteristics in the liquid 57 can be synthesized by various methods using known materials. For example, particles 60 maybe fabricated by stacking two layers of plate-like members made of materials having different performances, and pulverizing the stack into a desired size. Materials having a charging characteristic may be formed, for example, by adding a charge control agent to synthetic resin. Examples of charging additives include an ion conductivity imparting agent used as an antistatic agent. The ion conductivity imparting agent can be formed by compounding lithium perchlorate or the like with a polymer chiefly containing polyalkylene glycol.

The foregoing embodiment has described an example where the particles 60 are spheres. However, such an example is not restrictive. The particles 60 may have spheroidal, cubic, rectangular solid, conical, cylindrical, and other outer shapes as long as the particles 60 can operate inside the cavities 56a. The operation of the particles 60 having a non-spherical outer shape can temporally change the diffusion characteristic of the screen 40 by surface reflection, without an internal diffusion function of the particles 60.

The optical sheet 50, the particle layer 55, and the particles 60 may be manufactured by a method different from that described in the foregoing embodiment. The liquid 57 does not need to be provided if the particles 60 are operably retained with respect to the retaining part 56.

The foregoing embodiment has described an example of the layered structure of the screen 40. However, this is not restrictive. The screen 40 may include other functional layers that are expected to provide certain functions. One functional layer may provide two or more functions. For example, the first cover layer 46, the second cover layer 47, the first substrate 51, the second substrate 52, or the like may serve as the functional layer. Examples of the functions to be given to a functional layer may include an anti-reflection function, a hard-coating function with abrasion resistance, an ultraviolet shielding function, an ultraviolet reflection function, and an anti-stain function.

Figure 13:
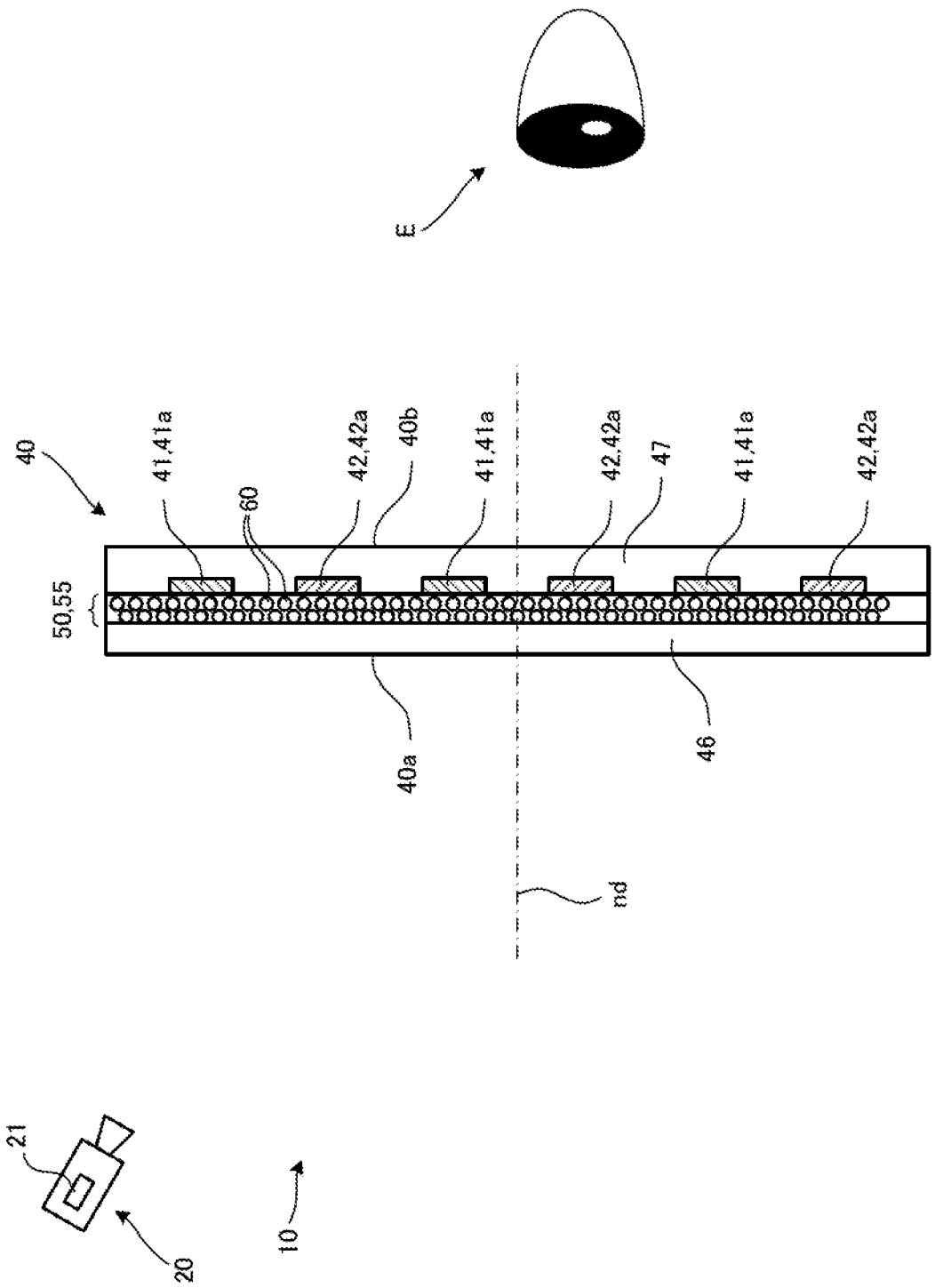
FIG. 13 illustrates an example of a screen including a plurality of linear electrode portions.

FIG. 13 illustrates an example of a screen 40 including a plurality of linear electrode portions.

The foregoing embodiment has described an example where the first electrode 41 and the second electrode 42 are formed flat and arranged to sandwich the particle layer 55. However, such an example is not restrictive. At least either one of the first and second electrodes 41 and 42 may be formed in stripes. In the example illustrated in FIG. 13, both the first electrode 41 and the second electrode 42 are formed in transparent stripes. More specifically, the first electrode 41 includes a plurality of first linear electrode portions 41a extending linearly. The plurality of first linear electrode portions 41a is arranged in a direction orthogonal to their longitudinal direction. Like the first electrode 41, the second electrode 42 also includes a plurality of second linear electrode portions 42a extending linearly. The plurality of second linear electrode portions 42a is arranged in the direction orthogonal to their longitudinal direction.

In the example illustrated in FIG. 13, the plurality of first linear electrode portions 41a constituting the first electrode 41 and the plurality of second linear electrode portions 42a constituting the second electrode 42 are both arranged on a surface on the same side of the optical sheet 50 as the observer is. The plurality of first linear electrode portions 41a constituting the first electrode 41 and the plurality of second linear electrode portions 42a constituting the second electrode 42 are alternately arranged along the same arrangement direction. The first electrode 41 and the second electrode 42 illustrated in FIG. 13 can also form an electric field in the particle layer 55 of the optical sheet 50 by application of a voltage from the power source 30.

The foregoing embodiment has described an example where the projector 20 projects light on the screen 40 by the raster scan method. However, such an example is not restrictive. The projector may use a method other than the raster scan method. For example, the projector may project image light on the entire area of the screen at each instant. Speckles can occur even if such a projector is used. However, the use of the foregoing screen can temporally change the diffusion wavefront of the screen 40 and effectively make the speckles not noticeable. Moreover, the foregoing screen can be used in combination with the projector disclosed in International Publication 2012/033174, described in the Background Art section. According to such a projector, speckles can be effectively reduced. The combination of the projector and the foregoing screen can further effectively make speckles not noticeable.

Figure 14:
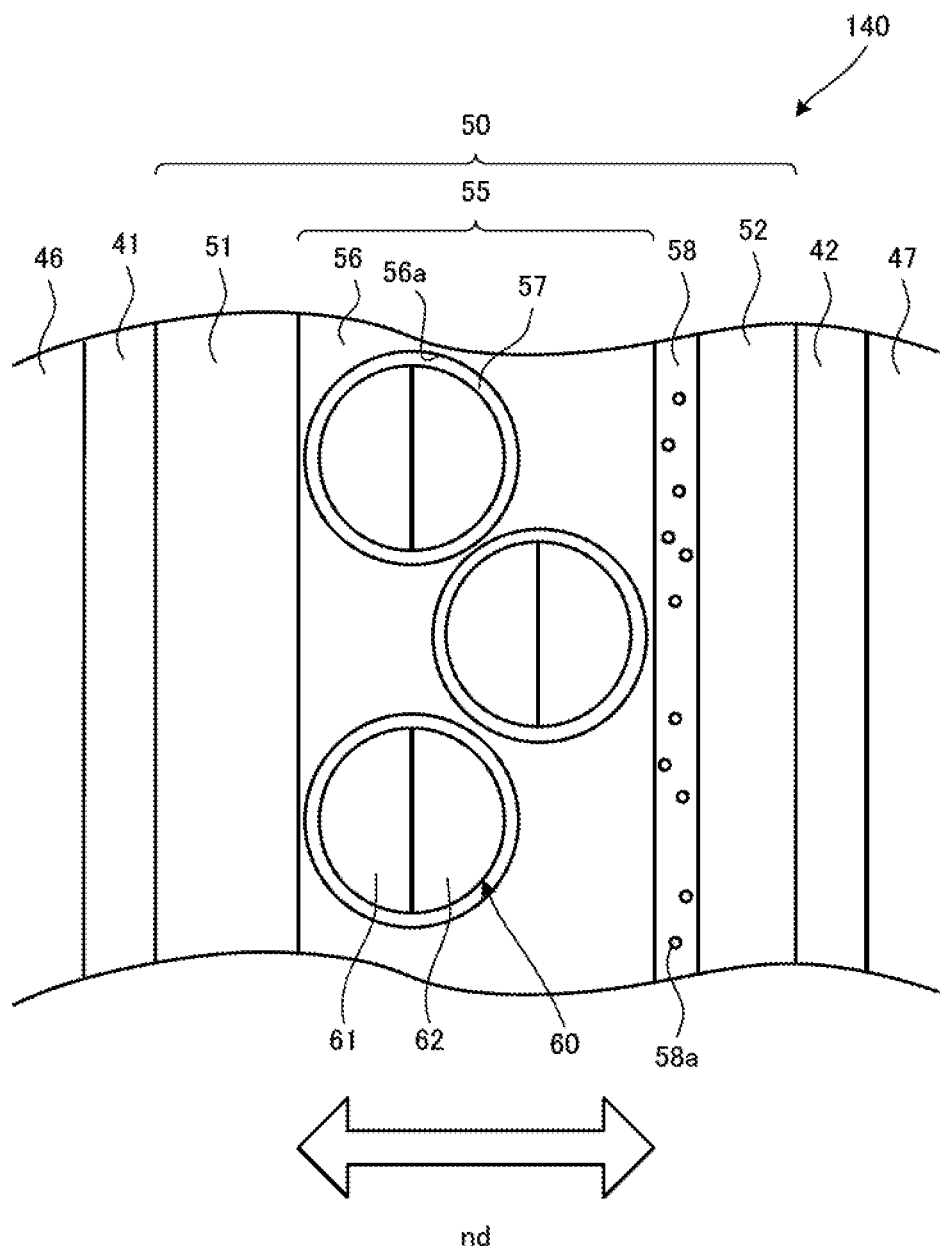
FIG. 14 illustrates apart of a cross section of a transmission type screen according to another embodiment.

FIG. 14 illustrates apart of a cross section of a transmission type screen 140 according to another embodiment.

The transmission type screen 140 includes a diffuse transmission layer 58 added to the optical sheet 50 of the screen 40 illustrated in FIG. 3. The diffuse transmission layer 58 has a function of diffusing light during transmission. The rest of the configuration of the transmission type screen 140 may be the same as that of the screen 40 illustrated in FIG. 3.

The diffuse transmission layer 58 of the transmission type screen 140 may be provided between the second substrate 52 and the second electrode 42. Non-illustrated diffusion particulates 58*a* may be embedded in the second substrate 52 so that the second substrate 52 functions as the diffuse transmission layer 58. The non-illustrated diffusion particulates 58*b* may be included in the retaining part 56 or the liquid 57 of the particle layer 55 so that the particle layer 55 also functions as the diffuse transmission layer 58.

Figure 15:
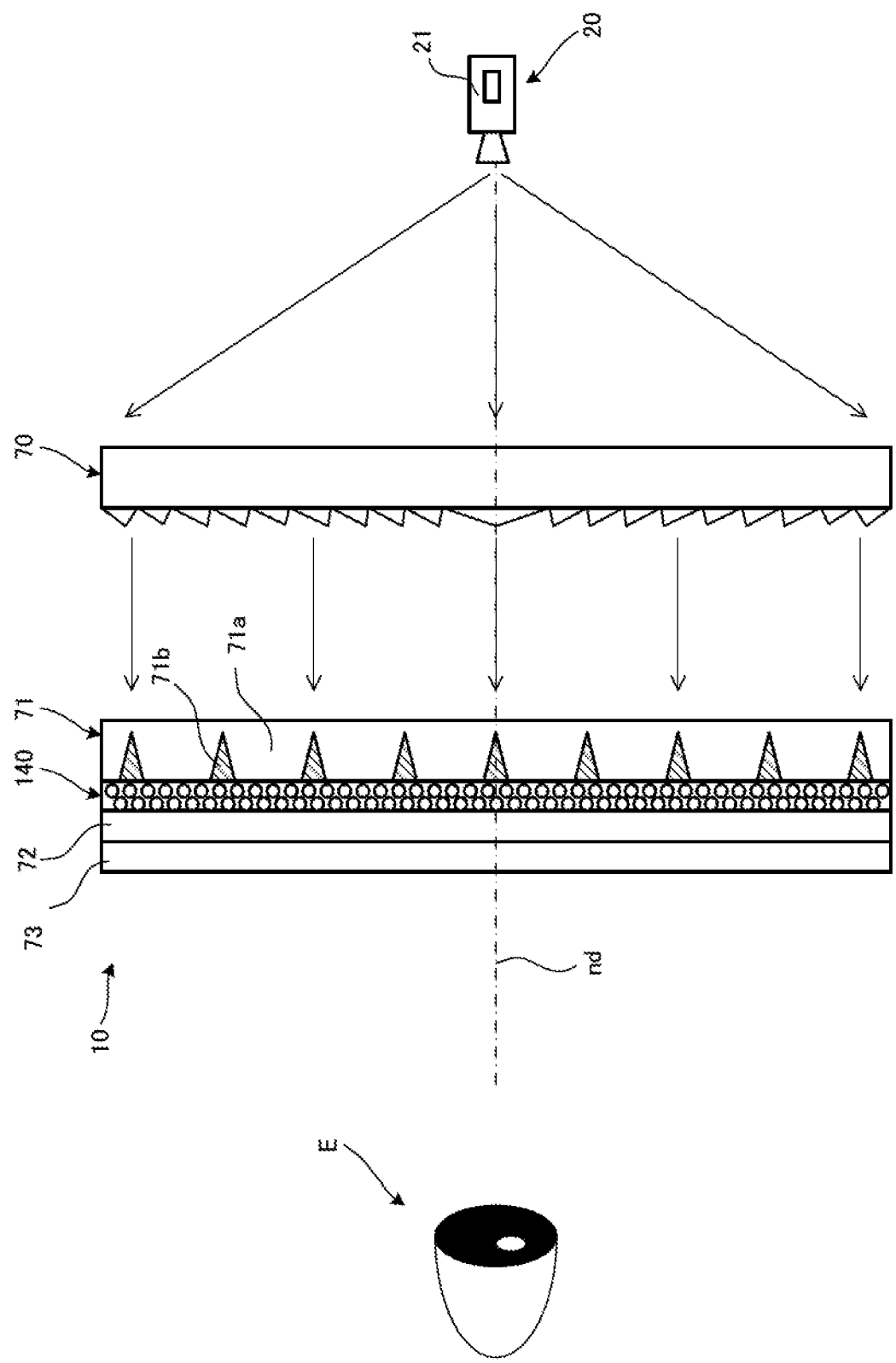
FIG. 15 illustrates an example of a display apparatus using the transmission type screen according to the present embodiment.

FIG. 15 illustrates an example of a display apparatus 10 using the transmission type screen 140 according to the present embodiment.

The transmission type display apparatus 10 according to the present embodiment includes a projector 20 and the screen 140 which is irradiated with image light from the projector 20. Here, the screen 140 may include at least the electrodes 41 and 42, the particle layer 55, and the diffuse transmission layer 58 among the components illustrated in FIG. 14.

The display apparatus 10 may use at least one of a Fresnel lens 70 arranged between the projector 20 and the screen 140, a viewing angle expansion part 71 for expanding the viewing angle of the screen 140, and a coloring part 72 for improving contrast. To improve the durability of the screen 140, a hard coat part 73 may be used.

The Fresnel lens 70 refracts the light emitted from the projector 20 and emits the light as substantially parallel light. The Fresnel lens 70 is arranged between the projector 20 and the screen 140. The Fresnel lens 70 may be either a concentric Fresnel lens or a linear Fresnel lens having a similar effect to that of a cylindrical lens. A Fresnel surface 70*a* of the Fresnel lens 70 may be directed toward either the projector 20 or the screen 140. The Fresnel lens 70 may be formed in a sheet-like shape.

Such a Fresnel lens 70 can be used to emit the light emitted from the projector 20 as substantially parallel light, whereby image quality on the screen 140 can be improved. The screen 140 can be formed thinly by forming the Fresnel lens 70 in a sheet shape.

The viewing angle expansion part 71 expands the viewing angle of the screen 140. In a first example illustrated in FIG. 15, the viewing angle expansion part 71 includes a substrate 71*a* of transparent resin, air, or the like, and light absorption portions 71*b* formed like black triangular prisms in the substrate 71*a*. The substrate 71*a* has a refractive index higher than that of the light absorption portions 71*b*.

The light emitted from the projector 20 is incident on the substrate 71*a* side of the viewing angle expansion part 71 and totally reflected by the slopes at the interfaces between the substrate 71*a* and the light absorption portions 71*b* to expand the viewing angle. Little light therefore enters the light absorption portions 71*b*, whereby the use efficiency of the light can be increased. The light absorption portions 71*b* absorb external light from the observer E side. This can improve contrast.

While the viewing angle expansion part 71 illustrated in FIG. 15 is formed by arranging the light absorption portions 71*b* in the vertical direction of the diagram to vertically diffuse light, the viewing angle expansion part 71 may be formed by arranging the light absorption portions 71*b* in a direction from the near side to the far side of the diagram to laterally diffuse light. The viewing angle expansion part 71 including the light absorption portions 71*b* arranged in the vertical direction of the diagram and the viewing angle expansion part 71 including the light absorption portions 71*b* arranged in the direction from the near side to the far side of the diagram may be stacked and used between the projector 20 and the observer E. The use of the stacked viewing angle expansion parts 71 can efficiently implement a screen having a wide viewing angle and high contrast without lowering the use efficiency of the light.

The coloring part 72 is a semitransparent layer or a layer colored with coloring dye, etc. The coloring part 72 lowers transmittance to improve contrast. The coloring part 72 does not need to be provided as an independent layer, and other parts may have a similar function. For example, the retaining part 56, the liquid 57, and the particles 60 may be colored for improved contrast. If a laser is used as the light source, the coloring part 72 may be colored to transmit only bright lines.

The hard coat layer 73 is formed by coating the outermost layer of the screen with a known hard coating material, and improves durability. The hard coat layer 73 may have water permeability or water repellency. For example, if the screen 140 is used in a low temperature environment, dew can condense on the hard coat layer 73. The surface of the hard coat layer 73 may therefore be formed by fluorine, silicon, or other coating, an uneven structure, attachment of a moisture absorbing layer, an electric heating layer, or the like. Dew condensation and stains can be prevent by thus forming the surface of the hard coat layer 73.

The display apparatus 10 may be equipped with a touch panel function. According to an infrared optical imaging method, an infrared sensor is provided in part of the display apparatus 10. If the display apparatus 10 is irradiated with infrared rays from outside, the infrared sensor detects the position of a touch on the display apparatus 10 as a location where the infrared irradiation is blocked, whereby a touch panel function is provided. The infrared irradiation portion may be a separately-provided irradiation device. Similarly, according to an ultrasonic method, a transmitter and a receiver of ultrasonic surface elastic waves are installed on the surface of the display apparatus 10. A contact position is identified from attenuation of the elastic waves. A capacitive or resistive touch panel may be provided inside or externally attached to the display apparatus 10. If the touch panel is provided inside the display apparatus, the touch panel layer may be formed between the screen 140 and the coloring part 72 illustrated in FIG. 16, or between the coloring part 72 and the hard coat layer 73.

Figure 16:
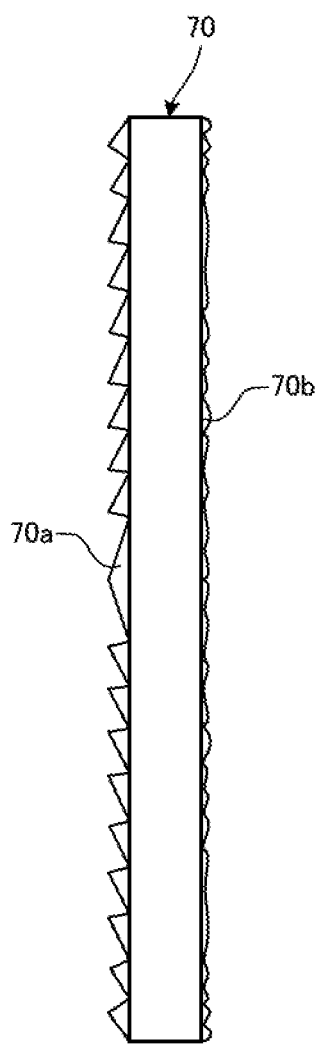
FIG. 16 illustrates another example of a Fresnel lens.

FIG. 16 illustrates another example of the Fresnel lens 70.

A surface of the Fresnel lens 70 opposite from the Fresnel surface 70a may be formed as a diffusion surface 70b having diffusibility. The diffusion surface 70b can be formed by making the surface uneven. The formation of such a diffusion surface 70b can improve the diffusibility of the entire screen.

Figure 17:
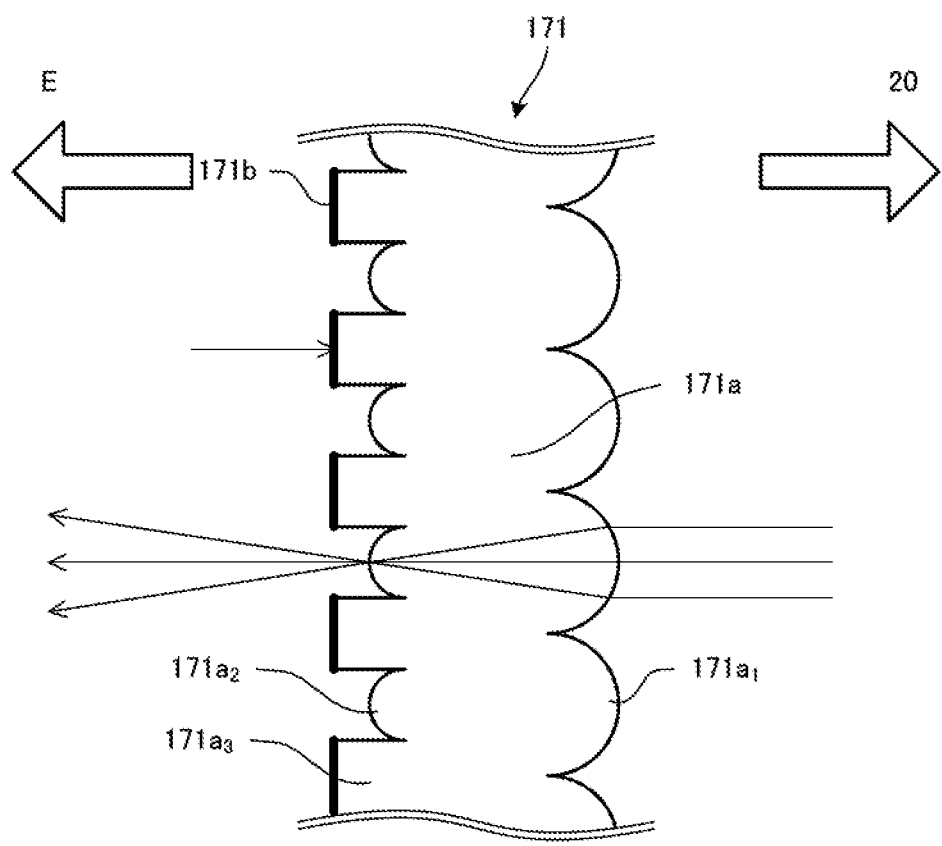
FIG. 17 illustrates a second example of a viewing angle expansion part.

FIG. 17 illustrates a second example of the viewing angle expansion part.

A viewing angle expansion part 171 according to the second example illustrated in FIG. 17 includes a lenticular lens 171a serving as a substrate, and light absorption portions 171b formed on part of the lenticular lens 171a.

The lenticular lens 171a includes minute slender first cylindrical lenses $171a_1$ arranged on the projector 20-side surface of the sheet, and minute slender second cylindrical lenses $171a_2$ and flat surface portions $171a_3$ alternately formed on the observer E-side surface of the sheet. The flat surface portions $171a_3$ of the lenticular lens 171a form the light absorption portions 171b. The lenticular lens 171a is made of transparent resin. The light absorption portions 171b are formed by black coating or the like.

The light emitted from the projector 20 is incident on the first cylindrical lenses $171a_1$ of the lenticular lens 171a of the field of viewing angle expansion part 171, and emitted from the second cylindrical lenses $171a_2$ to expand the viewing angle. Little light is therefore incident on the light absorption portions 171b, whereby the use efficiency of light can be improved. The light absorption portions 171b absorb external light from the observer E side. This can improve contrast.

While the viewing angle expansion part 171 illustrated in FIG. 17 is formed by arranging the first cylindrical lenses $171a_1$ and the second cylindrical lenses $171a_2$ in the vertical direction of the diagram to vertically diffuse light, the viewing angle expansion part 171 may be formed by arranging the first cylindrical lenses $171a_1$ and the second cylindrical lenses $171a_2$ in the direction from the near side to the far side of the diagram to laterally diffuse light. The field of viewing angle expansion part 171 including the first cylindrical lenses $171a_1$ and the second cylindrical lenses $171a_2$ arranged in the vertical direction of the diagram and the field of viewing angle expansion part 171 including the first cylindrical lenses $171a_1$ and the second cylindrical lenses $171a_2$ arranged in the direction from the near side to the far side of the drawing may be stacked and used between the projector 20 and the observer E. The use of the stacked field of viewing angle expansion parts 171 can efficiently implement a screen having a wide viewing angle and high contrast without lowering the use efficiency of the light.

The viewing angle expansion part 171 may be a microlens array or the like. The light absorption portions 171b may be a pinhole array or the like.

Figure 18:
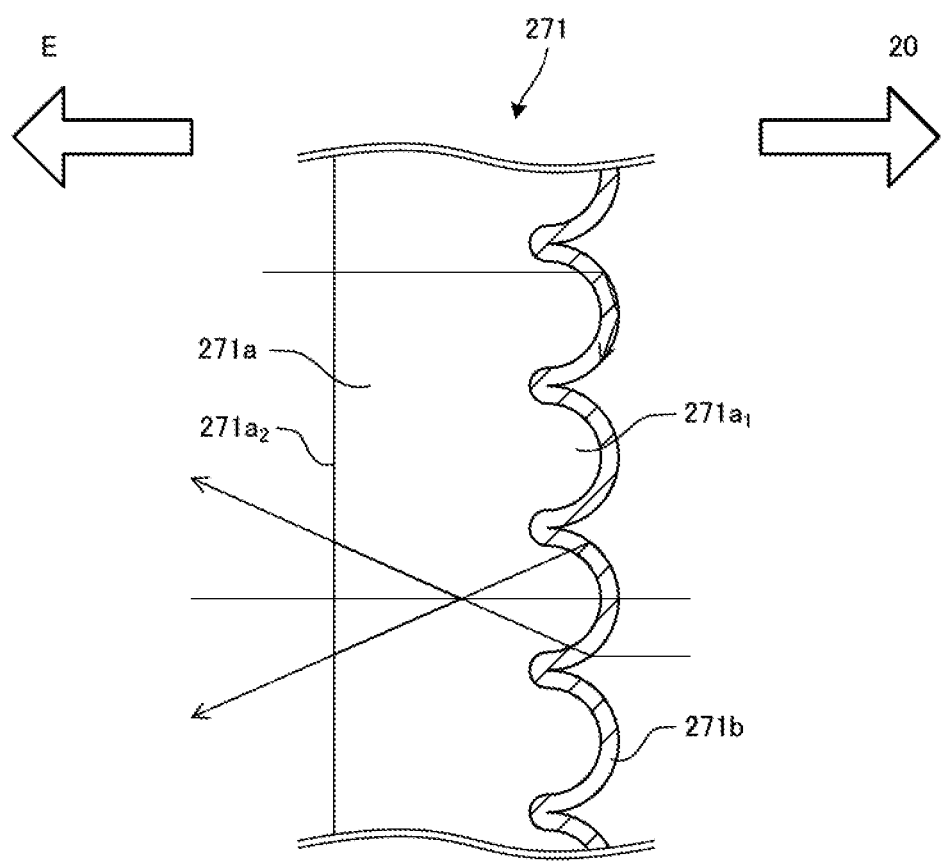
FIG. 18 illustrates a third example of the viewing angle expansion part.

FIG. 18 illustrates a third example of the viewing angle expansion part.

A viewing angle expansion part 271 according to the third example illustrated in FIG. 18 includes a lenticular lens 271a serving as a substrate, and a light absorption portion 271b formed on part of the lenticular lens 271a.

The lenticular lens 271a includes minute slender cylindrical lenses $271a_1$ arranged on the projector 20-side surface of the sheet. A flat surface portion $271a_2$ is formed on the observer E-side surface of the sheet. The lenticular lens 271a is formed of transparent resin. The light absorption portion 271b is formed to cover the cylindrical lenses $271a_1$ of the lenticular lens 271a. The light absorption portion 271b is formed in layers by coating or the like.

The light emitted from the projector 20 is incident on the light absorption portion 271b of the field of view expansion part 271, and emitted from the flat surface portion $271a_2$ to expand the viewing angle. The light absorption portion 271b repeats internal reflection to attenuate external light from the observer E side. This can improve contrast.

While the viewing angle expansion part 271 illustrated in FIG. 18 is formed by arranging the cylindrical lenses $271a_1$ in the vertical direction of the drawing to vertically diffuse light, the viewing angle expansion part 271 may be formed by arranging the cylindrical lenses $271a_1$ in the direction from the near side to the far side of the drawing to laterally diffuse light. The v field of viewing angle expiation part 271 including the cylindrical lenses $271a_1$ arranged in the vertical direction of the drawing and the field of viewing angle expansion part 271 including the cylindrical lenses $271a_1$ arranged in the direction from the near side to the far side of the drawing may be stacked and used between the projector 20 and the observer E. The use of the stacked field of viewing angle expansion parts 271 can efficiently implement a screen having a wide viewing angle and high contrast without lowering the use efficiency of the light.

The viewing angle expansion part 271 maybe a microlens array or the like.

Next, the diffuse transmission layer 58 according to the present embodiment will be further described. In the present embodiment, the diffuse transmission layer 58 may include the diffusion particulates 58a to provide the function of diffusing light.

In the case of the diffuse transmission layer 58, the diffusion particulates 58a may be made of materials such as resin beads and silicon dioxide which have a small refractive index difference from the main component such as acrylic resin. The diffusion particulates 58a that have a small refractive index difference from the main component are likely to cause forward scattering and are preferably used for transmission type.

The diffuse transmission layer 58 may be separated from the particle layer 55. There may be a layer of air between the diffuse transmission layer 58 and the particle layer 55. The diffuse transmission layer 58 may be provided on both sides of the particle layer 55.

Figure 19:
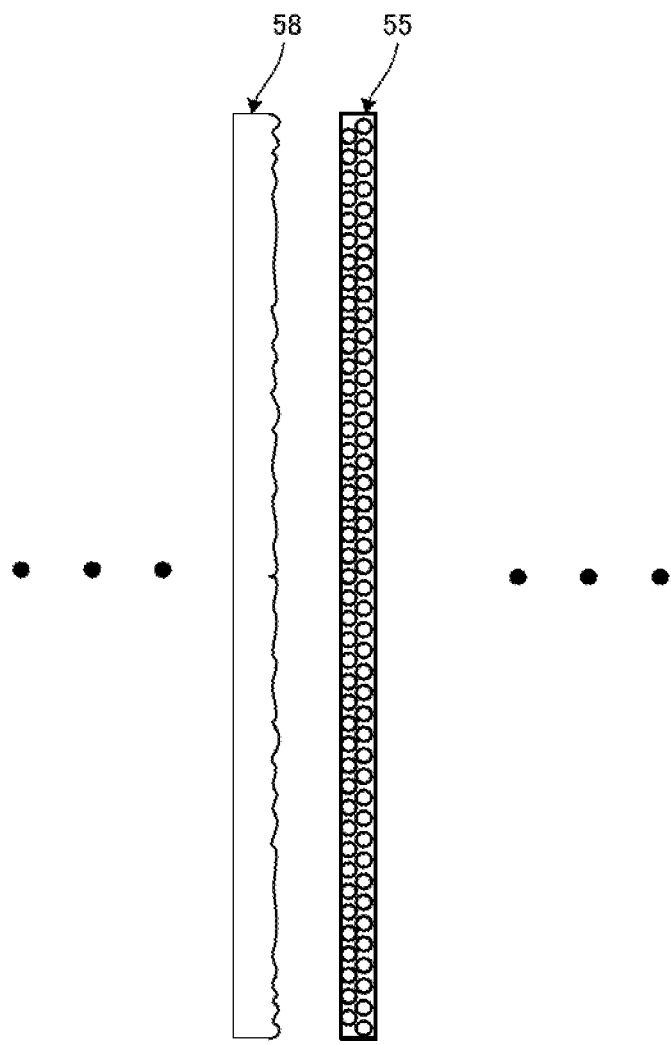
FIG. 19 illustrates another example of a diffusion part.

FIG. 19 illustrates another example of the diffuse transmission layer 58.

The diffuse transmission layer 58 may be configured as a diffuse transmission layer 58 by forming irregular protrusions and recesses on the surface. In such a case, the protrusions and recesses of the diffuse transmission layer 58 may be formed on the particle layer 55 side. As illustrated in FIG. 19, the diffuse transmission layer 58 may be separated from the particle layer 55. There may be a layer of air between the diffuse transmission layer 58 and the particle layer 55. The diffuse transmission layer 58 may be provided on both sides of the particle layer 55.

Next, the particles 60 will be further described. In the present embodiment, as illustrated in FIG. 4, the particles 60 are multiphase polymer particles, and include the first portion 61 and the second portion 62. The first portion 61 and the second portion 62 may be referred to as a first polymer portion 61 and a second polymer portion 62.

In the case of a reflection type particle 60, the first main portion 66a and the second main portion 67a of the particle 60 may be made of acrylic resin or the like. The first diffusion components 66b and the second diffusion components 67b may be made of a metal compound such as titanium oxide which has a large refractive index difference from the first main portion 66a and the second main portion 67a. The first and second main portions 66a and 67a and the first and second diffusion components 66b and 67b having a large refractive index difference therebetween are likely to cause backward scattering and are preferably used for reflection type.

In the case of a transmission type particle 60, the first main portion 66a and the second main portion 67a of the particle 60 may be made of acrylic resin or the like. The first diffusion components 66b and the second diffusion components 67b may be made of material such as silicon dioxide which has a small refractive index difference from the first main portion 66a and the second main portion 67a. The first and second main portions 66a and 67a and the first and second diffusion components 66b and 67b having a small refractive index difference therebetween are likely to cause forward scattering and are preferably used for transmission type.

In the particle layer 55, the retaining part 56, the liquid 57, and the particles 60 may be colored with a coloring agent.

Figure 20A:
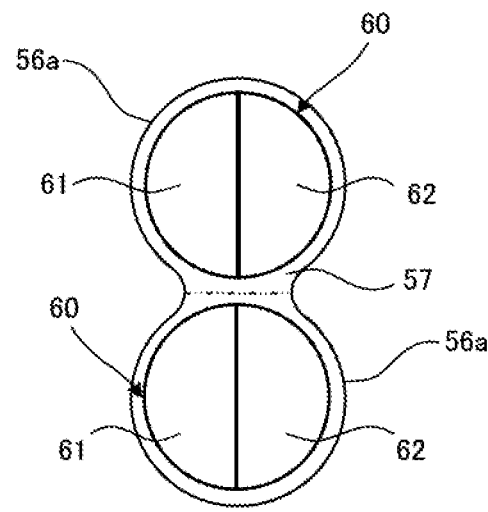
FIGS. 20A and 20B illustrate the concept of a cavity to a particle.
Figure 20B:
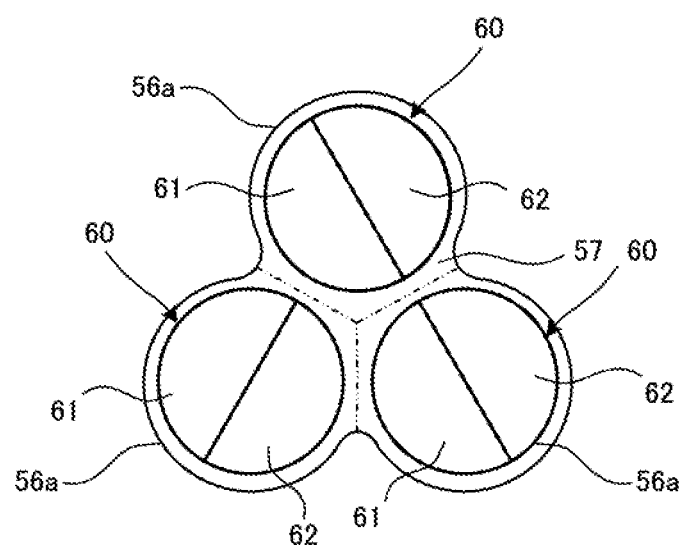

FIGS. 20A and 20B illustrate the concept of a cavity 56a to a particle 60.

In the present embodiment, a single particle 60 is included in a single cavity 56a. A single cavity 56a refers to a unit beyond which a particle 60 is not movable. In the example illustrated in FIG. 20A, two cavities 56a include respective particles 60. In the example illustrated in FIG. 20B, three cavities 56a include respective particles 60. In other words, a single particle 60 is included in a single cavity 56a.

In the example of the particle 60 illustrated in FIG. 4, the first diffusion components 66b and the second diffusion components 67b are spheres. However, such an example is not restrictive. The particles 60 may have a spheroidal, cubic, rectangular solid, conical, cylindrical, or other outer shapes.

If the first diffusion components 66b and the second diffusion components 67b have a shape such as a spheroidal, cubic, rectangular solid, conical, or cylindrical shape, the diameter refers to an area equivalent circular diameter (Heywood diameter). An area equivalent circular diameter d can be determined from the following equation:

$$d=(4\times S/\pi)^{1/2},$$

where d is the area equivalent circular diameter, and

S is an area obtained from a transmission electron microscope (TEM) image of the cross section of the diffusion component.

The particles 60 preferably have a diameter of 30 μm to 200 μm. If the particles 60 are not spherical in shape, an area equivalent circular diameter d is also determined from the foregoing equation.

The diameter is obtained from a photomicrograph or a scanning electron microscope (SEM) image. A volume fraction is determined from an area fraction obtained from a SEM image or TEM image of the cross section of the particle. If the area fraction is x:y, the volume fraction is $x^{3/2}:y^{3/2}$.

To determine a refractive index difference, slice samples of the particle are initially fabricated by using a focused ion beam (FIB). Qualitative/quantitative elemental analyses of the main portions and the diffusion components are performed by using an apparatus in which a transmission electron microscope or scanning electron microscope is combined with a detector of energy dispersive X-ray spectrometry (EDX) or electron energy-loss spectroscopy (EELS). A chemical state analysis of the elements is further performed if needed. The components of the main portions and the diffusion components are estimated, and a difference between the refractive indexes of the respective components is determined.

In the present embodiment, transparent refers to that when a slice fabricated by a microtome is measured for transmittance and reflectance by microspectroscopy, the transmittance exceeds the reflectance at any wavelength in the visible light region.

As described above, according to an example of the optical sheet 50 of the present embodiment, there is provided the particle layer 55 including the transparent retaining part 56 that has a predetermined thickness and the particles 60 that are accommodated in the cavities 56a formed in the retaining part 56 and include the first portion 61 and the second portion 62 having different dielectric constants. The first portion 61 includes the transparent first main portion 66a and the first diffusion components 66b that diffuse light. The second portion 62 includes the transparent second main portion 67a and the second diffusion components 67b that diffuse light. The first diffusion components 66b and the second diffusion components 67b have a diameter d satisfying the conditional expression (1) below. This can reduce differences in the scattering characteristics of the respective R, G, and B colors of the laser projector, and reduce color unevenness at locations such as the center and the four corners of the screen 40 or due to the viewing angle. Laminar flows of two compositions are formed in the microchannel, so that particles 60 can be smoothly formed and clogging of the flow channel or the inlet of the flow channel can be suppressed.

$$0.1\ \mu m<d<15\ \mu m \tag{1}$$

According to an example of the optical sheet 50 of the present embodiment, the volume fraction Vi indicating the proportion of the sum of the volumes of the first diffusion components 66b and the second diffusion components 67b to the volume of the particle 60 satisfies the conditional expression (2) below. Beams not contributing to speckle reduction can thus be reduced as much as possible.

$$Vi\geq3\% \tag{2}$$

According to an example of the optical sheet 50 of the present embodiment, a refractive index difference Δn between the first and second diffusion components 66b and 67b and the first and second main portions 66a and 67b satisfies the conditional expression (3) below. This causes forward scattering more than backward scattering, and increases transmitted beams.

$$|\Delta n|\leq0.2 \tag{3}$$

According to an example of the screen 40 of the present embodiment, there are provided the optical sheet 50 and the electrodes 41 and 42 which form an electric field for driving the particles 60 in the particle layer 56 when a voltage is applied thereto. The particles 60 including the first portion 61 and the second portion 62 having different dielectric constants can thus be precisely operated according to the electric field formed by the electrodes 41 and 42. The operation of the particles 60 having a reflection diffusion function can temporally change the diffusion characteristic of the screen 40 for sufficient reduction of speckles.

According to an example of the screen 40 of the present embodiment, the electrodes 41 and 42 have a function of diffusing and reflecting light as the diffuse reflection layer 53. A new diffuse reflection layer 53 therefore does not need to be provided, and the optical sheet 50 can be reduced in thickness.

According to an example of the display apparatus 10 of the present embodiment, there are provided the screen 40 and the projector 20 which irradiates the screen 40 with coherent light. Speckles of the coherent light projected from the projector 20 can thus be sufficiently reduced.

According to an example of the display apparatus 10 of the present embodiment, there are further provided the power source 30 which applies a voltage to the electrodes 41 and 42 of the screen 40, and the control device 35 which controls the applied voltage applied from the power source 30 to the electrodes 41 and 42. The control device 35 controls the applied voltage from the power source 30 so that the particles 60 operate in the particle layer 55. The particles 60 can thus be operated more precisely, and speckles can further be sufficiently reduced.

According to an example of the display apparatus 10 of the present embodiment, the control device 35 controls the applied voltage from the power source 30 to repeatedly rotate the particles 60 within an angular range of less than 180°. At least either one of the first and second portions 61 and 62 can thus be selected and precisely positioned on the observer side.

According to an example of the display apparatus 10 of the present embodiment, the control device 35 controls at least either one of the direction and the position of the particles 60 by the applied voltage of the power source 30 so that the first portion 61 covers at least part of the second portion 62 from the observer side along the normal direction of the screen 40. Even if the first portion 61 and the second portion 62 do not have exactly the same color, a change in the color tone of the screen 40 can thus be effectively made less perceptible while an image is displayed with the particles 60 in operation.

While the optical sheet 50, the screen 40, and the display apparatus 10 have been described based on several embodiments, the present invention is not limited to such embodiments, and various combinations or modifications may be made.

EXPLANATION OF REFERENCE SYMBOLS

10: display
20: projector
21: coherent light source
30: power source
35: control device
40: screen
41: first electrode
42: second electrode
46: first cover layer
47: second cover layer
50: optical sheet
51: first substrate
52: second substrate
55: particle layer
56: retaining part
56a: cavity
57: liquid
60: particle
61: first portion
66a: first main portion
66b: first diffusion component
62: second portion
67a: second main portion
67b: second diffusion component

What is claimed is:

1. An optical sheet comprising a particle layer including a transparent retaining part that has a predetermined thickness,
at least one particle, and
at least one cavity, wherein
the particle is accommodated in the cavity formed in the retaining part and includes a first portion and a second portion having different dielectric constants,
the cavity is larger than the particle,
a liquid is provided in the cavity and outside the particle so that the particle is movable in the cavity,
the first portion includes a transparent first main portion and a first diffusion component that diffuses light,
the second portion includes a transparent second main portion and a second diffusion component that diffuses light, and
the first diffusion component and the second diffusion component have a respective diameter d satisfying the following conditional expression (1):

$$0.1 \ \mu m < d < 15 \ \mu m \tag{1}$$

2. The optical sheet according to claim 1, wherein a volume fraction Vi indicating a proportion of a sum of volumes of the first diffusion component and the second diffusion component to a volume of the particle satisfies the following conditional expression (2):

$$Vi \geq 3\% \tag{2}$$

3. The optical sheet according to claim 2, wherein a refractive index difference Δn between the first and second diffusion components and the first and second main portions satisfies the following conditional expression (3):

$$|\Delta n| < 0.2 \tag{3}$$

4. A screen comprising:
the optical sheet according to claim 3; and
an electrode that forms an electric field for driving the particle of the particle layer when a voltage is applied thereto.

5. A screen comprising:
the optical sheet according to claim 2; and
an electrode that forms an electric field for driving the particle of the particle layer when a voltage is applied thereto.

6. A screen comprising:
the optical sheet according to claim 1; and
an electrode that forms an electric field for driving the particle of the particle layer when a voltage is applied thereto.

7. The screen according to claim 6, wherein the electrode has a function of diffusing and reflecting light as a diffuse reflection layer.

8. A display apparatus comprising:
the screen according to claim 7; and
a projector that irradiates the screen with coherent light.

9. A display apparatus comprising:
the screen according to claim 6; and
a projector that irradiates the screen with coherent light.

10. The display apparatus according to claim 9, further comprising:
a power source that applies a voltage to the electrode of the screen; and
a control device that controls an applied voltage from the power source to the electrode, wherein
the control device controls the applied voltage from the power source to operate the particle in the particle layer.

11. The display apparatus according to claim 10, wherein the control device controls the applied voltage from the power source to repeatedly rotate the particle within an angular range of less than 180°.

12. The display apparatus according to claim 11, wherein the control device controls at least either one of a direction and a position of the particle by the applied voltage from the power source so that the first portion covers at least part of the second portion from an observer side along a normal direction of the screen.

13. The display apparatus according to claim 10, wherein the control device controls at least either one of a direction and a position of the particle by the applied voltage from the power source so that the first portion covers at least part of the second portion from an observer side along a normal direction of the screen.

14. The optical sheet according to claim 1, wherein a color difference $\Delta E^*ab$ between a color of the first portion and a color of the second portion satisfy the following conditional expression (4):

$$\Delta E^*ab (=[(\Delta L^*)^2+(\Delta a^*)^2+(\Delta b^*)^2]^{1/2}) \leq 1.5$$

wherein $\Delta L^*$ is lightness and $a^*$ and $b^*$ are chromaticities.

* * * * *